United States Patent
Jhu et al.

(10) Patent No.: US 12,368,868 B2
(45) Date of Patent: Jul. 22, 2025

(54) VIDEO CODING USING MULTI-MODEL LINEAR MODEL

(71) Applicant: BEIJING DAJIA INTERNET INFORMATION TECHNOLOGY CO., LTD., Beijing (CN)

(72) Inventors: Hong-Jheng Jhu, Beijing (CN); Xiaoyu Xiu, Beijing (CN); Yi-Wen Chen, Beijing (CN); Wei Chen, Beijing (CN); Che-wei Kuo, Beijing (CN); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 15 days.

(21) Appl. No.: 18/485,908

(22) Filed: Oct. 12, 2023

(65) Prior Publication Data

US 2024/0040133 A1  Feb. 1, 2024

Related U.S. Application Data

(63) Continuation of application No. PCT/US2022/025184, filed on Apr. 18, 2022.
(Continued)

(51) Int. Cl.
*H04N 19/11* (2014.01)
*H04N 19/132* (2014.01)
(Continued)

(52) U.S. Cl.
CPC ........... *H04N 19/186* (2014.11); *H04N 19/11* (2014.11); *H04N 19/132* (2014.11);
(Continued)

(58) Field of Classification Search
CPC .... H04N 19/186; H04N 19/11; H04N 19/132; H04N 19/136; H04N 19/176; H04N 19/184; H04N 19/593; H04N 19/70
(Continued)

(56) References Cited

U.S. PATENT DOCUMENTS

2017/0359595 A1   12/2017  Zhang et al.
2017/0366807 A1   12/2017  Thoreau et al.
(Continued)

FOREIGN PATENT DOCUMENTS

JP   2018501710 A   1/2018
JP   2019530330 A   10/2019
(Continued)

OTHER PUBLICATIONS

Japanese Office Action corresponding to Japanese Patent Application No. 2023-563028 (Foreign Text, 5 Pages, English Translation Thereof, 4 Pages) (Oct. 22, 2024).
(Continued)

*Primary Examiner* — Nguyen T Truong
(74) *Attorney, Agent, or Firm* — Myers Bigel, P.A.

(57) ABSTRACT

A computing device performs a method of decoding video data by generating a multi-model linear model (MMLM) including a first linear model between the minimum luma value and the threshold luma value, and a second linear model between the threshold luma value and the maximum luma value from a group of reference luma samples and a group of reference chroma samples; and reconstructing a respective sample value of the chroma block from a weighted combination of a respective first corresponding reconstructed sample value of the luma block using the multi-model linear model, and a respective second reconstructed sample value of a neighboring chroma block from an intra prediction mode.

20 Claims, 20 Drawing Sheets

Related U.S. Application Data

(60) Provisional application No. 63/176,140, filed on Apr. 16, 2021.

(51) Int. Cl.
*H04N 19/136* (2014.01)
*H04N 19/176* (2014.01)
*H04N 19/184* (2014.01)
*H04N 19/186* (2014.01)
*H04N 19/593* (2014.01)
*H04N 19/70* (2014.01)

(52) U.S. Cl.
CPC ......... *H04N 19/136* (2014.11); *H04N 19/176* (2014.11); *H04N 19/184* (2014.11); *H04N 19/593* (2014.11); *H04N 19/70* (2014.11)

(58) Field of Classification Search
USPC .................................................... 375/240.12
See application file for complete search history.

(56) References Cited

U.S. PATENT DOCUMENTS

| | | | |
|---|---|---|---|
| 2018/0077426 A1 | 3/2018 | Zhang et al. | |
| 2020/0154115 A1 | 5/2020 | Ramasubramonian et al. | |
| 2020/0177878 A1 | 6/2020 | Choi et al. | |
| 2020/0304833 A1 | 9/2020 | Budagavi | |
| 2021/0067802 A1 | 3/2021 | Jin et al. | |
| 2021/0084305 A1 | 3/2021 | Choi et al. | |

FOREIGN PATENT DOCUMENTS

| | | |
|---|---|---|
| KR | 20210030444 A | 3/2021 |
| WO | 2018053293 A1 | 3/2018 |
| WO | 2020146553 A1 | 7/2020 |
| WO | 2020186763 A1 | 9/2020 |

OTHER PUBLICATIONS

Extended European Search Report corresponding to European Application No. 22789076.1 (Feb. 5, 2025).
First Examination Report corresponding to Indian Patent Application No. 202347076906 (Mar. 4, 2025).
Mora et al. "CE3-related: Decoder-side Intra Mode Derivation" Joint Video Experts Team (JVET) of ITU-T SG 16 WP 3 and ISO/IEC JTC 1/SC 29/WVG 11 (Oct. 3-12, 2018).
Japanese Office Action corresponding to Japanese Patent Application No. 2023-563028 (Foreign Text, 6 Pages, English Translation Thereof, 5 Pages) (Apr. 23, 2025).

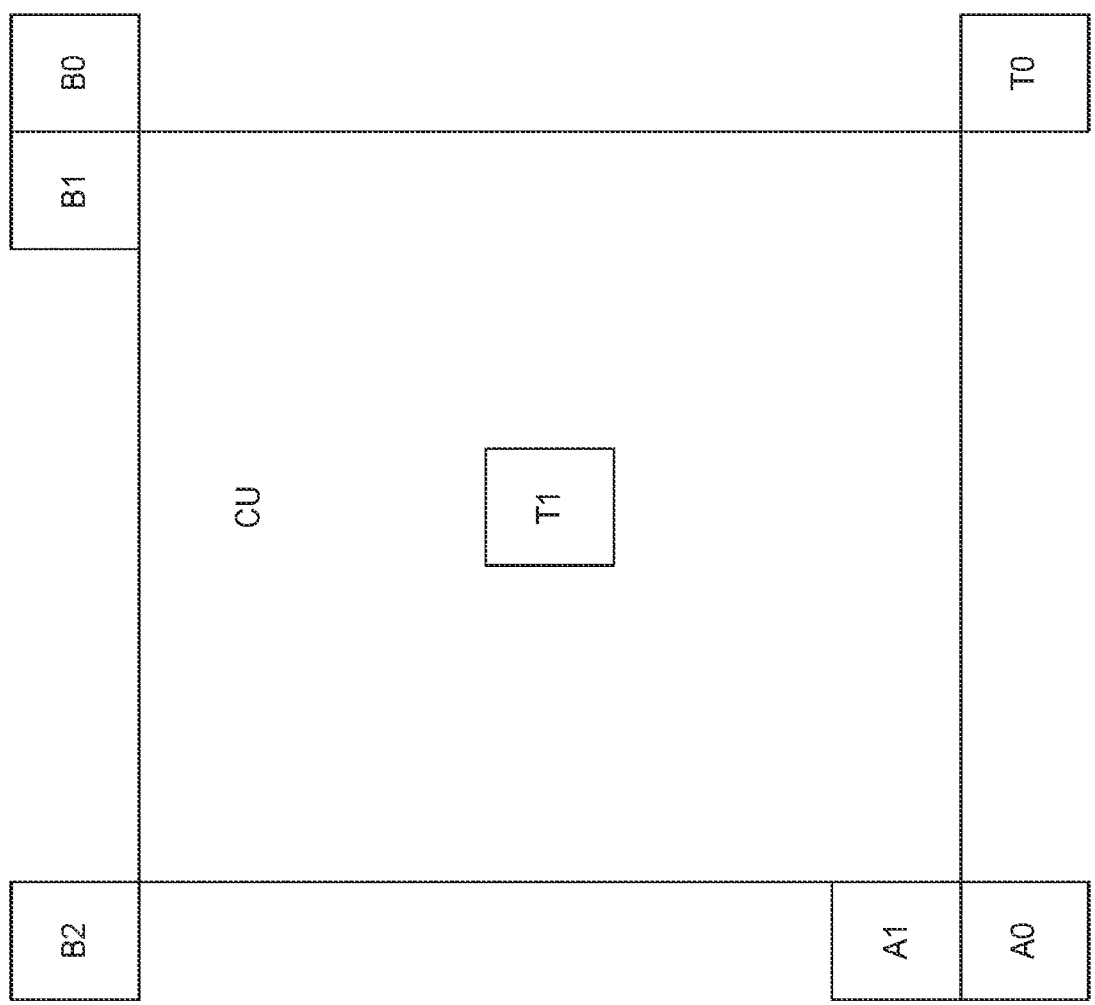

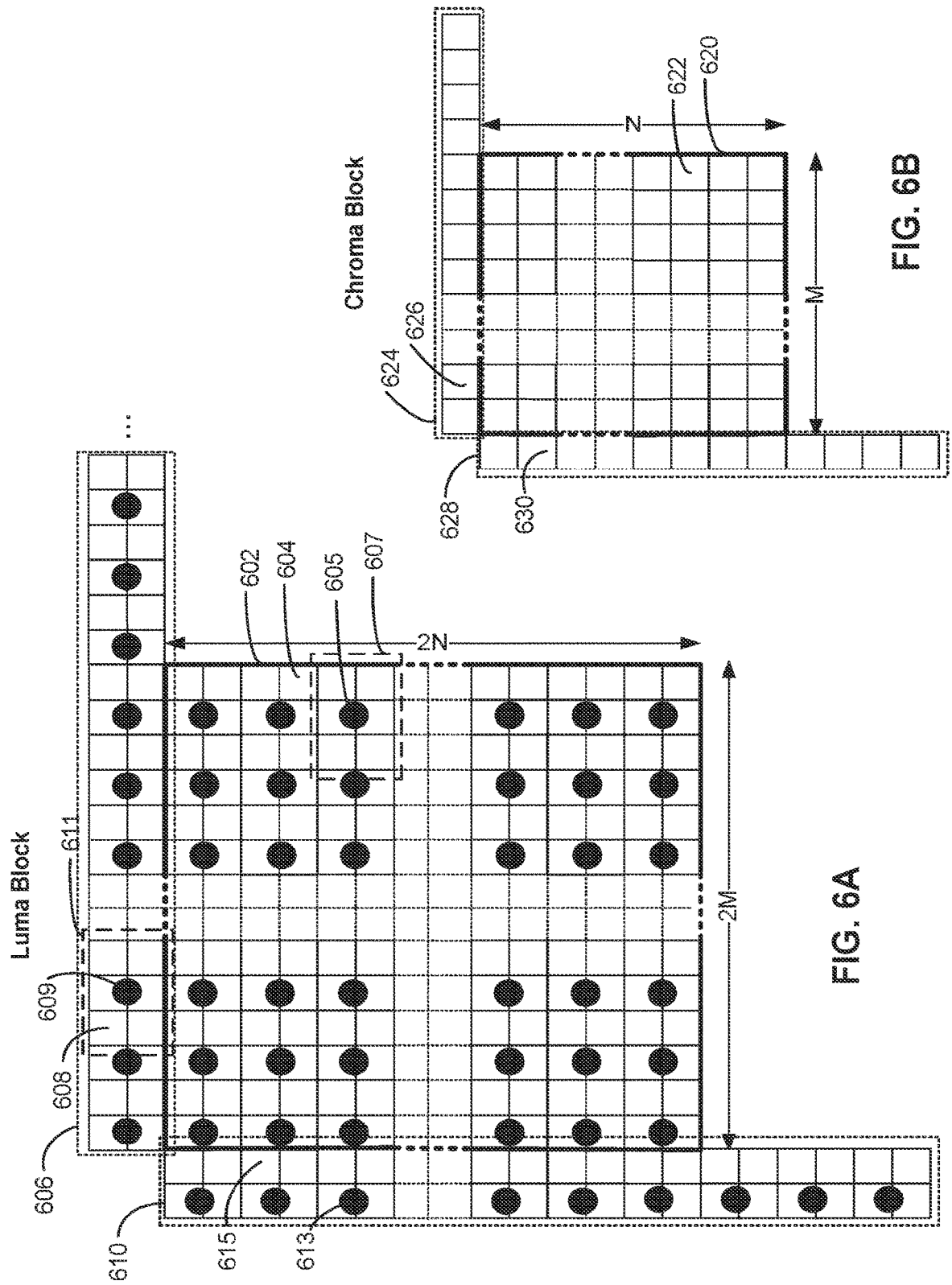

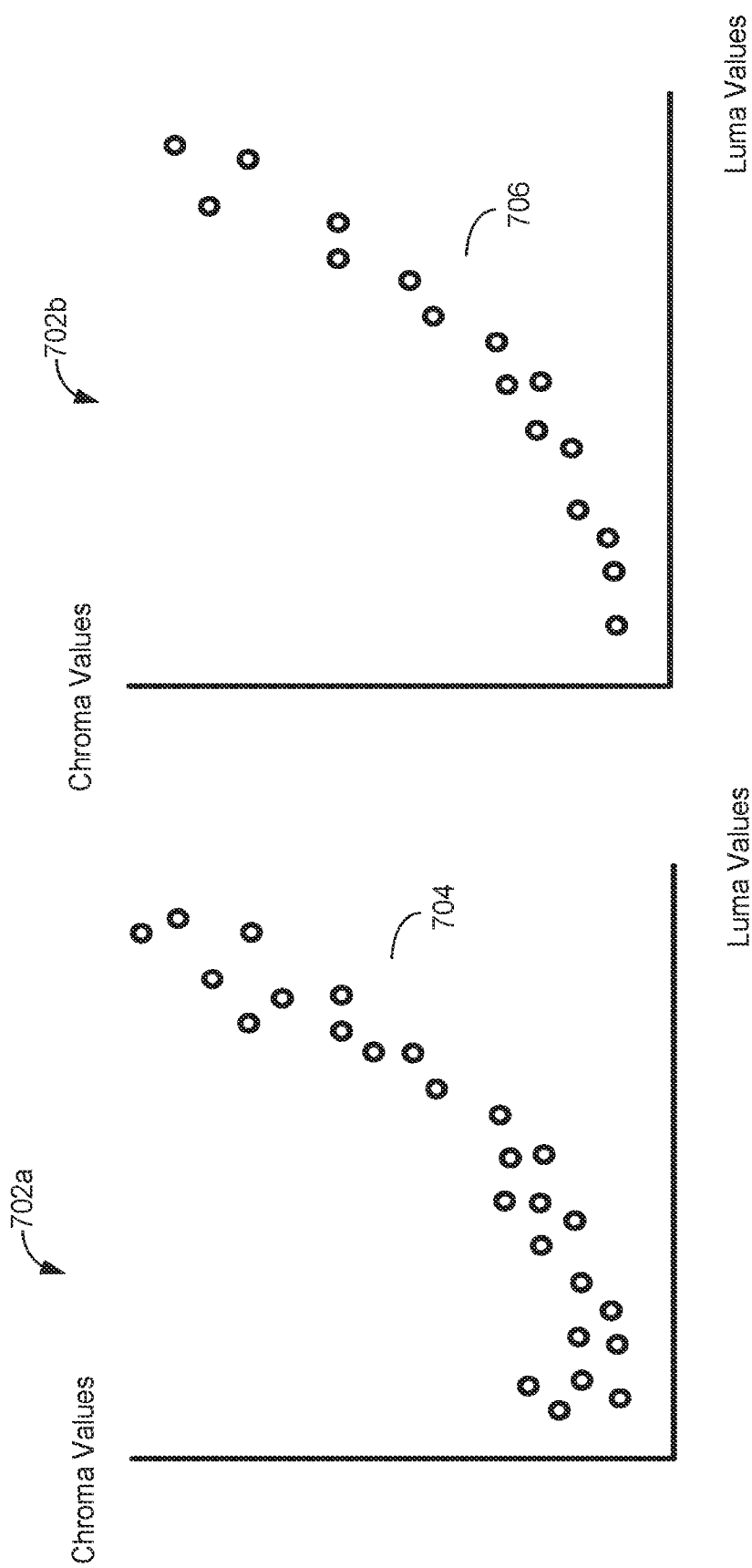

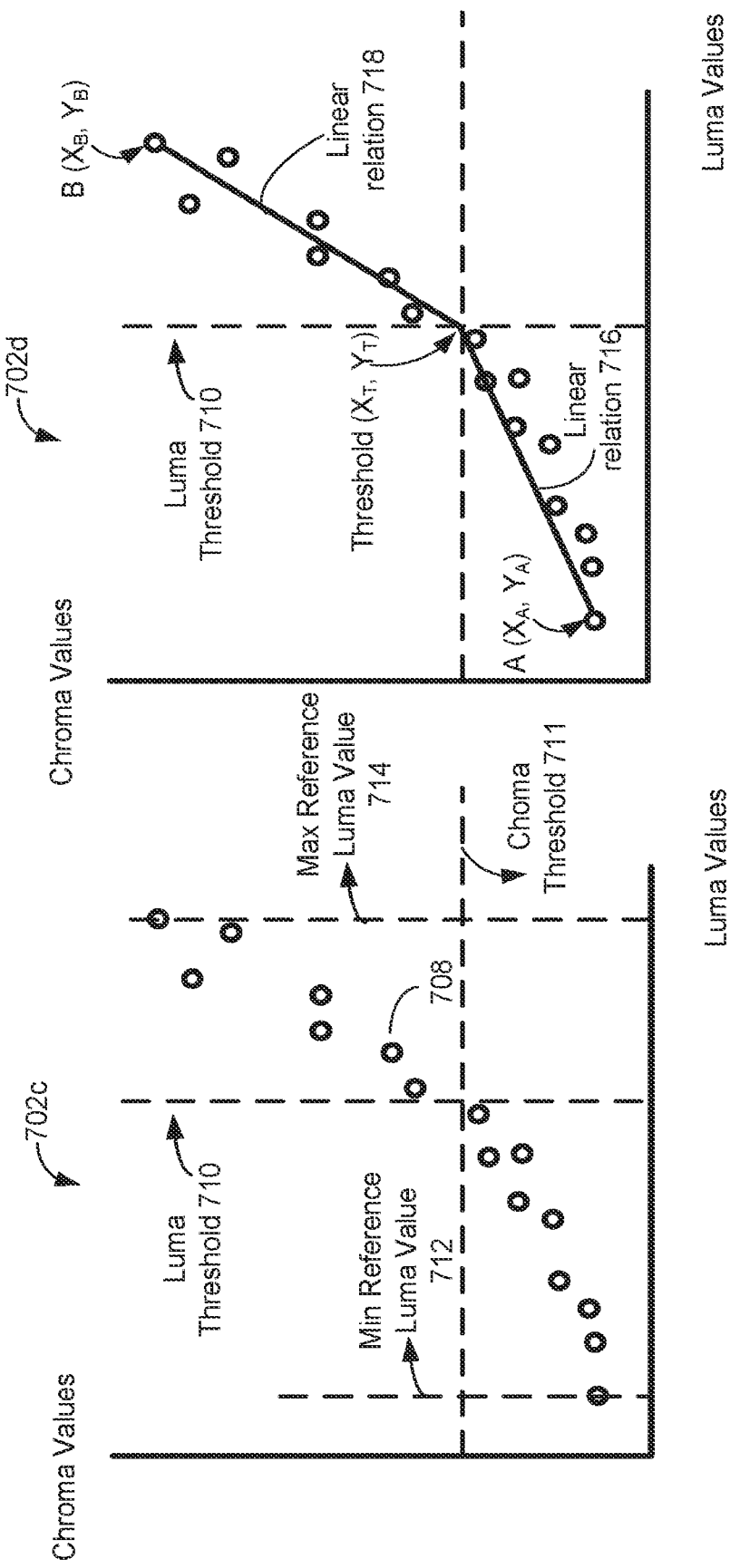

1100 receiving a bitstream encoding the chroma block, a corresponding luma block, a plurality of neighboring luma samples surrounding the luma block, and a plurality of neighboring chroma samples surrounding the chroma block 1110 decoding the luma block, the plurality of neighboring luma samples, and the plurality of neighboring chroma samples to obtain a plurality of reconstructed luma samples of the luma block, a plurality of reconstructed neighboring luma samples, and a plurality of reconstructed neighboring chroma samples, respectively 1120 selecting, from the plurality of reconstructed neighboring luma samples and the plurality of reconstructed neighboring chroma samples, a group of reference luma samples and a group of reference chroma samples, wherein each reference luma sample corresponds to a respective reference chroma sample 1130 computing a threshold luma value from the group of reference luma samples, and a corresponding threshold chroma value from the group of reference chroma samples 1140 determining a maximum luma value and a minimum luma value from the group of the reference luma samples, wherein the threshold luma value is between the minimum luma value and the maximum luma value 1150 generating a multi-model linear model including a first linear model between the minimum luma value and the threshold luma value, and a second linear model between the threshold luma value and the maximum luma value 1160 reconstructing a respective sample value of the chroma block from a weighted combination of a respective first corresponding reconstructed sample value of the luma block using the multi-model linear model, and a respective second reconstructed sample value of a neighboring chroma block from an intra prediction mode 1170

FIG. 11

VIDEO CODING USING MULTI-MODEL LINEAR MODEL

CROSS-REFERENCE TO RELATED APPLICATION

The present application is a continuation of PCT Application No. PCT/US2022/025184 filed Apr. 18, 2022, which application is based upon and claims priority to U.S. Provisional Patent Application No. 63/176,140, entitled "Video Coding Using Multi-model Linear Model" filed Apr. 16, 2021, the contents thereof are incorporated herein by reference in their entireties.

TECHNICAL FIELD

This application is related to video coding and compression, more specifically, to methods and apparatus on improving the coding efficiency, simplifying the complexity, and improving the accuracy of intra prediction.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. For example, video coding standards include Versatile Video Coding (VVC), Joint Exploration test Model (JEM), High-Efficiency Video Coding (HEVC/H.265), Advanced Video Coding (AVC/H.264), Moving Picture Expert Group (MPEG) coding, or the like. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

SUMMARY

The present application describes implementations related to video data encoding and decoding and, more particularly, to methods and apparatus on improving the coding efficiency, simplifying the complexity, and improving the accuracy of intra prediction using multi-model linear model (MMLM) and intra prediction mode.

According to a first aspect of the present application, a method of constructing a chroma block of a video signal, includes: receiving a bitstream encoding the chroma block, a corresponding luma block, a plurality of neighboring luma samples surrounding the luma block, and a plurality of neighboring chroma samples surrounding the chroma block; decoding the luma block, the plurality of neighboring luma samples, and the plurality of neighboring chroma samples to obtain a plurality of reconstructed luma samples of the luma block, a plurality of reconstructed neighboring luma samples, and a plurality of reconstructed neighboring chroma samples, respectively; selecting, from the plurality of reconstructed neighboring luma samples and the plurality of reconstructed neighboring chroma samples, a group of reference luma samples and a group of reference chroma samples, wherein each reference luma sample corresponds to a respective reference chroma sample; computing a threshold luma value from the group of reference luma samples, and a corresponding threshold chroma value from the group of reference chroma samples; determining a maximum luma value and a minimum luma value from the group of the reference luma samples, wherein the threshold luma value is between the minimum luma value and the maximum luma value; generating a multi-model linear model including a first linear model between the minimum luma value and the threshold luma value, and a second linear model between the threshold luma value and the maximum luma value; and reconstructing a respective sample value of the chroma block from a weighted combination of a respective first corresponding reconstructed sample value of the luma block using the multi-model linear model, and a respective second reconstructed sample value of a neighboring chroma block from an intra prediction mode.

According to a second aspect of the present application, an electronic apparatus includes one or more processing units, memory and a plurality of programs stored in the memory. The programs, when executed by the one or more processing units, cause the electronic apparatus to perform the method of coding video signal as described above.

According to a third aspect of the present application, a non-transitory computer readable storage medium stores a plurality of programs for execution by an electronic apparatus having one or more processing units. The programs, when executed by the one or more processing units, cause the electronic apparatus to perform the method of coding video signal as described above.

According to a fourth aspect of the present application, a computer readable storage medium stores therein a bitstream comprising video information generated by the method for video decoding as described above.

It is to be understood that both the foregoing general description and the following detailed description are examples only and are not restrictive of the present disclosure.

BRIEF DESCRIPTION OF DRAWINGS

The accompanying drawings, which are included to provide a further understanding of the implementations and are incorporated herein and constitute a part of the specification, illustrate the described implementations and together with the description serve to explain the underlying principles. Like reference numerals refer to corresponding parts.

FIG. 5A is a block diagram illustrating spatially neighboring and temporally collocated block positions of a current CU to be encoded in accordance with some implementations of the present disclosure.

FIGS. 6A and 6B are block diagrams illustrating an exemplary previously-reconstructed luma block 602 and an exemplary associated chroma block 620 to be decoded, respectively, in accordance with some implementations of the present disclosure.

FIGS. 7A-7D are plot diagrams illustrating an exemplary process by which a video coder implements the techniques of deriving a multi-model linear model and applying the multi-model linear model to predict chroma samples of a coding unit in accordance with some implementations of the present disclosure.

FIG. 11 is a flowchart illustrating an exemplary process by which a video coder implements the techniques of combining the MMLM and intra prediction to predict or construct a chroma block of a video signal in accordance with some implementations of the present disclosure.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Figure 1:
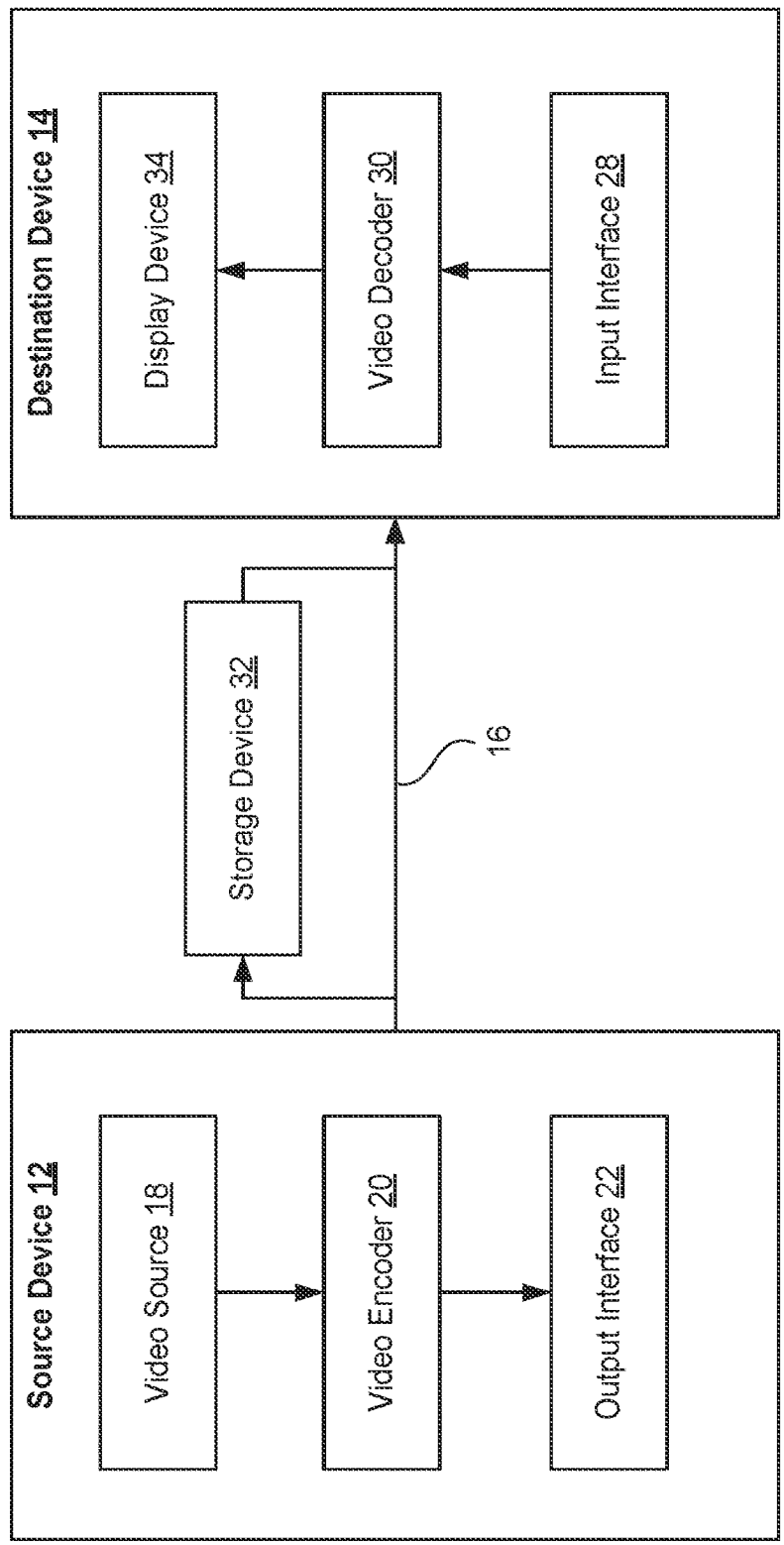
FIG. 1 is a block diagram illustrating an exemplary video encoding and decoding system in accordance with some implementations of the present disclosure.

FIG. 1 is a block diagram illustrating an exemplary system 10 for encoding and decoding video blocks in parallel in accordance with some implementations of the present disclosure. As shown in FIG. 1, system 10 includes a source device 12 that generates and encodes video data to be decoded at a later time by a destination device 14. Source device 12 and destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, source device 12 and destination device 14 are equipped with wireless communication capabilities.

In some implementations, destination device 14 may receive the encoded video data to be decoded via a link 16. Link 16 may comprise any type of communication medium or device capable of moving the encoded video data from source device 12 to destination device 14. In one example, link 16 may comprise a communication medium to enable source device 12 to transmit the encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some other implementations, the encoded video data may be transmitted from output interface 22 to a storage device 32. Subsequently, the encoded video data in storage device 32 may be accessed by destination device 14 via input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video data generated by source device 12. Destination device 14 may access the stored video data from storage device 32 via streaming or downloading. The file server may be any type of computer capable of storing encoded video data and transmitting the encoded video data to destination device 14. Exemplary file servers include a web server (e.g., for a website), an FTP server, network attached storage (NAS) devices, or a local disk drive. Destination device 14 may access the encoded video data through any standard data connection, including a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

As shown in FIG. 1, source device 12 includes a video source 18, a video encoder 20 and an output interface 22. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera of a security surveillance system, source device 12 and destination device 14 may form camera phones or video phones. However, the implementations described in the present application may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback. Output interface 22 may further include a modem and/or a transmitter.

Destination device 14 includes an input interface 28, a video decoder 30, and a display device 34. Input interface 28 may include a receiver and/or a modem and receive the encoded video data over link 16. The encoded video data communicated over link 16, or provided on storage device 32, may include a variety of syntax elements generated by video encoder 20 for use by video decoder 30 in decoding the video data. Such syntax elements may be included within the encoded video data transmitted on a communication medium, stored on a storage medium, or stored a file server.

In some implementations, destination device 14 may include a display device 34, which can be an integrated display device and an external display device that is configured to communicate with destination device 14. Display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to proprietary or industry standards, such as VVC, HEVC, MPEG-4, Part 10, Advanced Video Coding (AVC), or extensions of such standards. It should be understood that the present application is not limited to a specific video coding/decoding standard and may be applicable to other video coding/decoding standards. It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video coding/decoding operations disclosed in the present disclosure. Each of video encoder 20 and video decoder 30 may be included in one or more encoders or decoders, either of which may be integrated as part of a combined encoder/decoder (CODEC) in a respective device.

Figure 2:
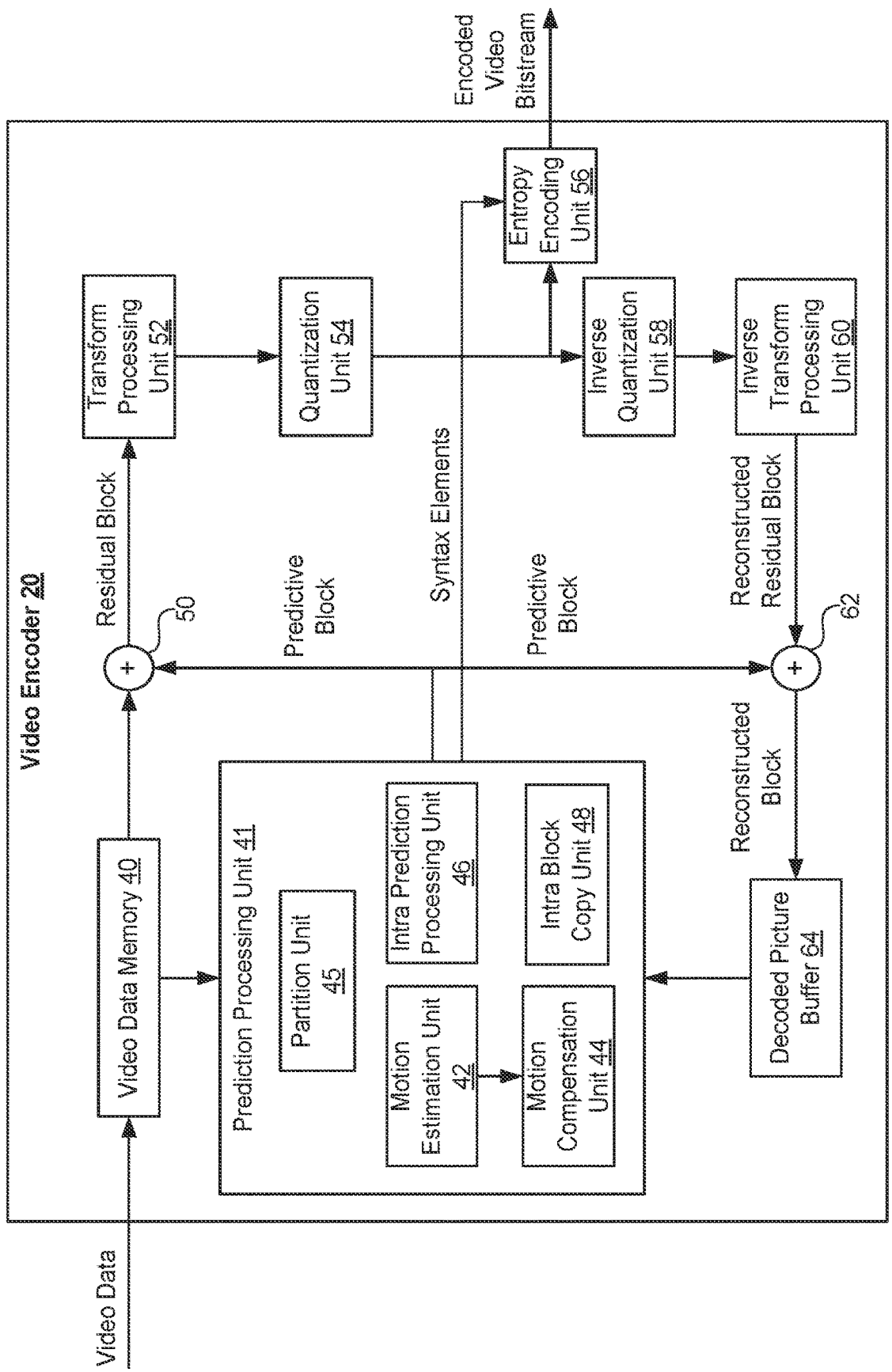
FIG. 2 is a block diagram illustrating an exemplary video encoder in accordance with some implementations of the present disclosure.

FIG. 2 is a block diagram illustrating an exemplary video encoder 20 in accordance with some implementations described in the present application. Video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 2, video encoder 20 includes video data memory 40, prediction processing unit 41, decoded picture buffer (DPB) 64, summer 50, transform processing unit 52, quantization unit 54, and entropy encoding unit 56. Prediction processing unit 41 further includes motion estimation unit 42, motion compensation unit 44, partition unit 45, intra prediction processing unit 46, and intra block copy (BC) unit 48. In some implementations, video encoder 20 also includes inverse quantization unit 58, inverse transform processing unit 60, and summer 62 for video block reconstruction. A deblocking filter (not shown) may be positioned between summer 62 and DPB 64 to filter block boundaries to remove blockiness artifacts from reconstructed video. An in loop filter (not shown) may also be used in addition to the deblocking filter to filter the output of summer 62. Video encoder 20 may take the form of a fixed or programmable hardware unit or may be divided among one or more of the illustrated fixed or programmable hardware units.

Video data memory 40 may store video data to be encoded by the components of video encoder 20. The video data in video data memory 40 may be obtained, for example, from video source 18. DPB 64 is a buffer that stores reference video data for use in encoding video data by video encoder 20 (e.g., in intra or inter predictive coding modes). Video data memory 40 and DPB 64 may be formed by any of a variety of memory devices. In various examples, video data memory 40 may be on-chip with other components of video encoder 20, or off-chip relative to those components.

As shown in FIG. 2, after receiving video data, partition unit 45 within prediction processing unit 41 partitions the video data into video blocks. This partitioning may also include partitioning a video frame into slices, tiles, or other larger coding units (CUs) according to a predefined splitting structures such as quad-tree structure associated with the video data. The video frame may be divided into multiple video blocks (or sets of video blocks referred to as tiles). Prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). Prediction processing unit 41 may provide the resulting intra or inter prediction coded block to summer 50 to generate a residual block and to summer 62 to reconstruct the encoded block for use as part of a reference frame subsequently. Prediction processing unit 41 also provides syntax elements, such as motion vectors, intra-mode indicators, partition information, and other such syntax information, to entropy encoding unit 56.

In order to select an appropriate intra predictive coding mode for the current video block, intra prediction processing unit 46 within prediction processing unit 41 may perform intra predictive coding of the current video block relative to one or more neighbor blocks in the same frame as the current block to be coded to provide spatial prediction. Motion estimation unit 42 and motion compensation unit 44 within prediction processing unit 41 perform inter predictive coding of the current video block relative to one or more predictive blocks in one or more reference frames to provide temporal prediction. Video encoder 20 may perform multiple coding passes, e.g., to select an appropriate coding mode for each block of video data.

In some implementations, motion estimation unit 42 determines the inter prediction mode for a current video frame by generating a motion vector, which indicates the displacement of a prediction unit (PU) of a video block within the current video frame relative to a predictive block within a reference video frame, according to a predetermined pattern within a sequence of video frames. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). The predetermined pattern may designate video frames in the sequence as P frames or B frames. Intra BC unit 48 may determine vectors, e.g., block vectors, for intra BC coding in a manner similar to the determination of motion vectors by motion estimation unit 42 for inter prediction, or may utilize motion estimation unit 42 to determine the block vector.

A predictive block is a block of a reference frame that is deemed as closely matching the PU of the video block to be coded in terms of pixel difference, which may be determined by sum of absolute difference (SAD), sum of square difference (SSD), or other difference metrics. In some implementations, video encoder 20 may calculate values for sub-integer pixel positions of reference frames stored in DPB 64. For example, video encoder 20 may interpolate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter prediction coded frame by comparing the position of the PU to the position of a predictive block of a reference frame selected from a first reference frame list (List 0) or a second reference frame list (List 1), each of which identifies one or more reference frames stored in DPB 64. Motion estimation unit 42 sends the calculated motion vector to motion compensation unit 44 and then to entropy encoding unit 56.

Motion compensation, performed by motion compensation unit 44, may involve fetching or generating the predictive block based on the motion vector determined by motion estimation unit 42. Upon receiving the motion vector for the PU of the current video block, motion compensation unit 44 may locate a predictive block to which the motion vector points in one of the reference frame lists, retrieve the predictive block from DPB 64, and forward the predictive block to summer 50. Summer 50 then forms a residual video block of pixel difference values by subtracting pixel values of the predictive block provided by motion compensation unit 44 from the pixel values of the current video block being coded. The pixel difference values forming the residual vide block may include luma or chroma difference components or both. Motion compensation unit 44 may also generate syntax elements associated with the video blocks of a video frame for use by video decoder 30 in decoding the video blocks of the video frame. The syntax elements may include, for example, syntax elements defining the motion vector used to identify the predictive block, any flags indicating the prediction mode, or any other syntax information described herein. Note that motion estimation unit 42 and motion compensation unit 44 may be highly integrated, but are illustrated separately for conceptual purposes.

In some implementations, intra BC unit 48 may generate vectors and fetch predictive blocks in a manner similar to that described above in connection with motion estimation unit 42 and motion compensation unit 44, but with the predictive blocks being in the same frame as the current block being coded and with the vectors being referred to as block vectors as opposed to motion vectors. In particular, intra BC unit 48 may determine an intra-prediction mode to use to encode a current block. In some examples, intra BC unit 48 may encode a current block using various intra-prediction modes, e.g., during separate encoding passes, and test their performance through rate-distortion analysis. Next, intra BC unit 48 may select, among the various tested intra-prediction modes, an appropriate intra-prediction mode to use and generate an intra-mode indicator accordingly. For example, intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, intra BC unit 48 may use motion estimation unit 42 and motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by sum of absolute difference (SAD), sum of squared difference (SSD), or other difference metrics, and identification of the predictive block may include calculation of values for sub-integer pixel positions.

Whether the predictive block is from the same frame according to intra prediction, or a different frame according to inter prediction, video encoder 20 may form a residual video block by subtracting pixel values of the predictive block from the pixel values of the current video block being coded, forming pixel difference values. The pixel difference values forming the residual video block may include both luma and chroma component differences.

Intra prediction processing unit 46 may intra-predict a current video block, as an alternative to the inter-prediction performed by motion estimation unit 42 and motion compensation unit 44, or the intra block copy prediction performed by intra BC unit 48, as described above. In particular, intra prediction processing unit 46 may determine an intra prediction mode to use to encode a current block. To do so, intra prediction processing unit 46 may encode a current block using various intra prediction modes, e.g., during separate encoding passes, and intra prediction processing unit 46 (or a mode select unit, in some examples) may select an appropriate intra prediction mode to use from the tested intra prediction modes. Intra prediction processing unit 46 may provide information indicative of the selected intra-prediction mode for the block to entropy encoding unit 56.

Entropy encoding unit 56 may encode the information indicating the selected intra-prediction mode in the bitstream.

After prediction processing unit 41 determines the predictive block for the current video block via either inter prediction or intra prediction, summer 50 forms a residual video block by subtracting the predictive block from the current video block. The residual video data in the residual block may be included in one or more transform units (TUs) and is provided to transform processing unit 52. Transform processing unit 52 transforms the residual video data into residual transform coefficients using a transform, such as a discrete cosine transform (DCT) or a conceptually similar transform.

Transform processing unit 52 may send the resulting transform coefficients to quantization unit 54. Quantization unit 54 quantizes the transform coefficients to further reduce bit rate. The quantization process may also reduce the bit depth associated with some or all of the coefficients. The degree of quantization may be modified by adjusting a quantization parameter. In some examples, quantization unit 54 may then perform a scan of a matrix including the quantized transform coefficients. Alternatively, entropy encoding unit 56 may perform the scan.

Following quantization, entropy encoding unit 56 entropy encodes the quantized transform coefficients into a video bitstream using, e.g., context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. The encoded bitstream may then be transmitted to video decoder 30, or archived in storage device 32 for later transmission to or retrieval by video decoder 30. Entropy encoding unit 56 may also entropy encode the motion vectors and the other syntax elements for the current video frame being coded.

Inverse quantization unit 58 and inverse transform processing unit 60 apply inverse quantization and inverse transformation, respectively, to reconstruct the residual video block in the pixel domain for generating a reference block for prediction of other video blocks. As noted above, motion compensation unit 44 may generate a motion compensated predictive block from one or more reference blocks of the frames stored in DPB 64. Motion compensation unit 44 may also apply one or more interpolation filters to the predictive block to calculate sub-integer pixel values for use in motion estimation.

Summer 62 adds the reconstructed residual block to the motion compensated predictive block produced by motion compensation unit 44 to produce a reference block for storage in DPB 64. The reference block may then be used by intra BC unit 48, motion estimation unit 42 and motion compensation unit 44 as a predictive block to inter predict another video block in a subsequent video frame.

Figure 3:
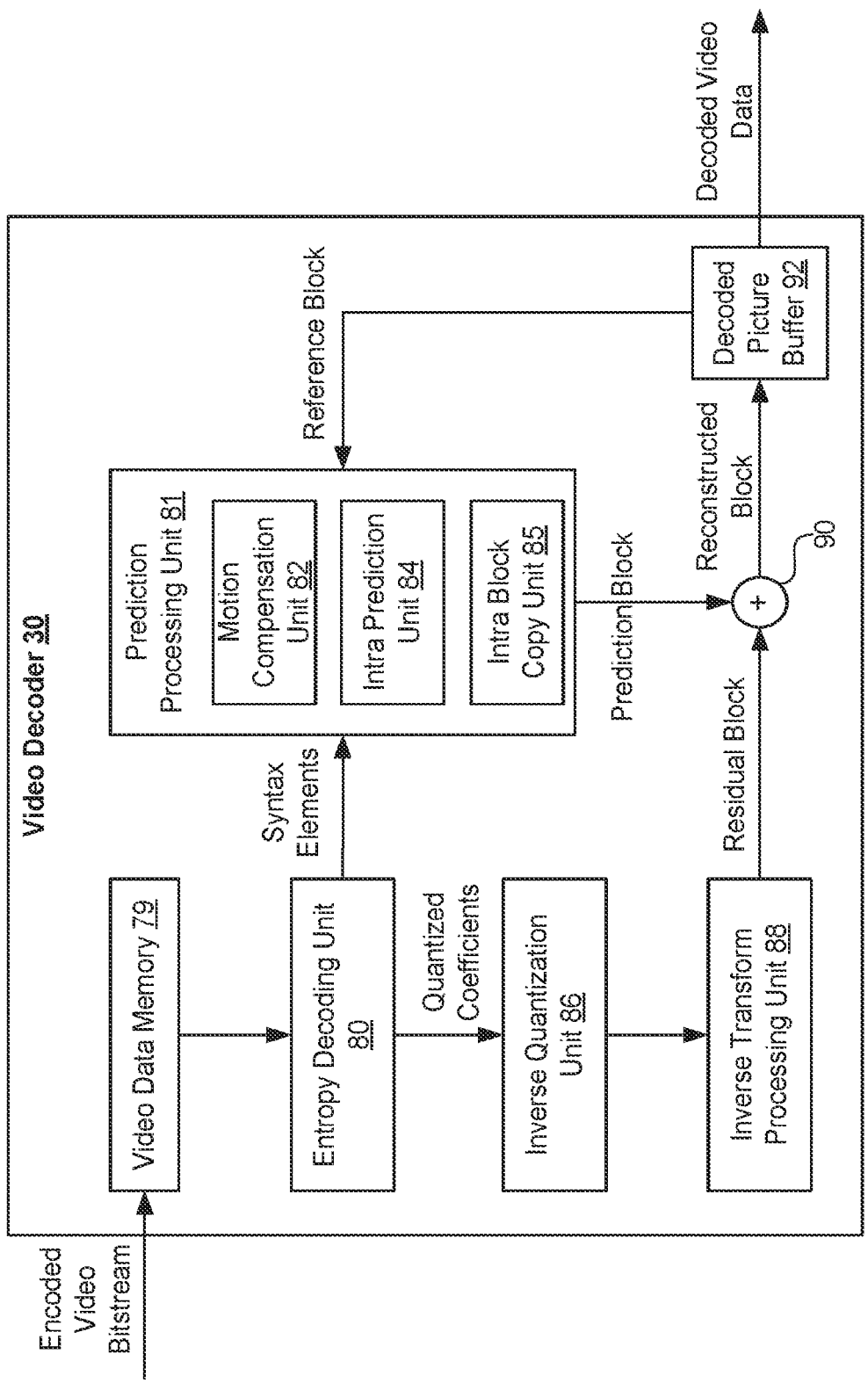
FIG. 3 is a block diagram illustrating an exemplary video decoder in accordance with some implementations of the present disclosure.

FIG. 3 is a block diagram illustrating an exemplary video decoder 30 in accordance with some implementations of the present application. Video decoder 30 includes video data memory 79, entropy decoding unit 80, prediction processing unit 81, inverse quantization unit 86, inverse transform processing unit 88, summer 90, and DPB 92. Prediction processing unit 81 further includes motion compensation unit 82, intra prediction processing unit 84, and intra BC unit 85. Video decoder 30 may perform a decoding process generally reciprocal to the encoding process described above with respect to video encoder in connection with FIG. 2. For example, motion compensation unit 82 may generate prediction data based on motion vectors received from entropy decoding unit 80, while intra-prediction unit 84 may generate prediction data based on intra-prediction mode indicators received from entropy decoding unit 80.

In some examples, a unit of video decoder 30 may be tasked to perform the implementations of the present application. Also, in some examples, the implementations of the present disclosure may be divided among one or more of the units of video decoder 30. For example, intra BC unit 85 may perform the implementations of the present application, alone, or in combination with other units of video decoder 30, such as motion compensation unit 82, intra prediction processing unit 84, and entropy decoding unit 80. In some examples, video decoder 30 may not include intra BC unit 85 and the functionality of intra BC unit 85 may be performed by other components of prediction processing unit 81, such as motion compensation unit 82.

Video data memory 79 may store video data, such as an encoded video bitstream, to be decoded by the other components of video decoder 30. The video data stored in video data memory 79 may be obtained, for example, from storage device 32, from a local video source, such as a camera, via wired or wireless network communication of video data, or by accessing physical data storage media (e.g., a flash drive or hard disk). Video data memory 79 may include a coded picture buffer (CPB) that stores encoded video data from an encoded video bitstream. Decoded picture buffer (DPB) 92 of video decoder 30 stores reference video data for use in decoding video data by video decoder 30 (e.g., in intra or inter predictive coding modes). Video data memory 79 and DPB 92 may be formed by any of a variety of memory devices, such as dynamic random access memory (DRAM), including synchronous DRAM (SDRAM), magneto-resistive RAM (MRAM), resistive RAM (RRAM), or other types of memory devices. For illustrative purpose, video data memory 79 and DPB 92 are depicted as two distinct components of video decoder 30 in FIG. 3. But it will be apparent to one skilled in the art that video data memory 79 and DPB 92 may be provided by the same memory device or separate memory devices. In some examples, video data memory 79 may be on-chip with other components of video decoder 30, or off-chip relative to those components.

During the decoding process, video decoder 30 receives an encoded video bitstream that represents video blocks of an encoded video frame and associated syntax elements. Video decoder 30 may receive the syntax elements at the video frame level and/or the video block level. Entropy decoding unit 80 of video decoder 30 entropy decodes the bitstream to generate quantized coefficients, motion vectors or intra-prediction mode indicators, and other syntax elements. Entropy decoding unit 80 then forwards the motion vectors and other syntax elements to prediction processing unit 81.

When the video frame is coded as an intra predictive coded (I) frame or for intra coded predictive blocks in other types of frames, intra prediction processing unit 84 of prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, motion compensation unit 82 of prediction processing unit 81 produces one or more predictive blocks for a video block of the current video frame based on the motion vectors and other syntax elements received from entropy decoding unit 80. Each of the predictive blocks may be produced from a reference frame within one of the reference frame lists. Video decoder 30 may construct the reference frame lists, List 0 and List 1, using default construction techniques based on reference frames stored in DPB 92.

In some examples, when the video block is coded according to the intra BC mode described herein, intra BC unit 85 of prediction processing unit 81 produces predictive blocks for the current video block based on block vectors and other syntax elements received from entropy decoding unit 80. The predictive blocks may be within a reconstructed region of the same picture as the current video block defined by video encoder 20.

Motion compensation unit 82 and/or intra BC unit 85 determines prediction information for a video block of the current video frame by parsing the motion vectors and other syntax elements, and then uses the prediction information to produce the predictive blocks for the current video block being decoded. For example, motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, intra BC unit 85 may use some of the received syntax elements, e.g., a flag, to determine that the current video block was predicted using the intra BC mode, construction information of which video blocks of the frame are within the reconstructed region and should be stored in DPB 92, block vectors for each intra BC predicted video block of the frame, intra BC prediction status for each intra BC predicted video block of the frame, and other information to decode the video blocks in the current video frame.

Motion compensation unit 82 may also perform interpolation using the interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes the quantized transform coefficients provided in the bitstream and entropy decoded by entropy decoding unit 80 using the same quantization parameter calculated by video encoder 20 for each video block in the video frame to determine a degree of quantization. Inverse transform processing unit 88 applies an inverse transform, e.g., an inverse DCT, an inverse integer transform, or a conceptually similar inverse transform process, to the transform coefficients in order to reconstruct the residual blocks in the pixel domain.

After motion compensation unit 82 or intra BC unit 85 generates the predictive block for the current video block based on the vectors and other syntax elements, summer 90 reconstructs decoded video block for the current video block by summing the residual block from inverse transform processing unit 88 and a corresponding predictive block generated by motion compensation unit 82 and intra BC unit 85. An in-loop filter (not pictured) may be positioned between summer 90 and DPB 92 to further process the decoded video block. The decoded video blocks in a given frame are then stored in DPB 92, which stores reference frames used for subsequent motion compensation of next video blocks. DPB 92, or a memory device separate from DPB 92, may also store decoded video for later presentation on a display device, such as display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
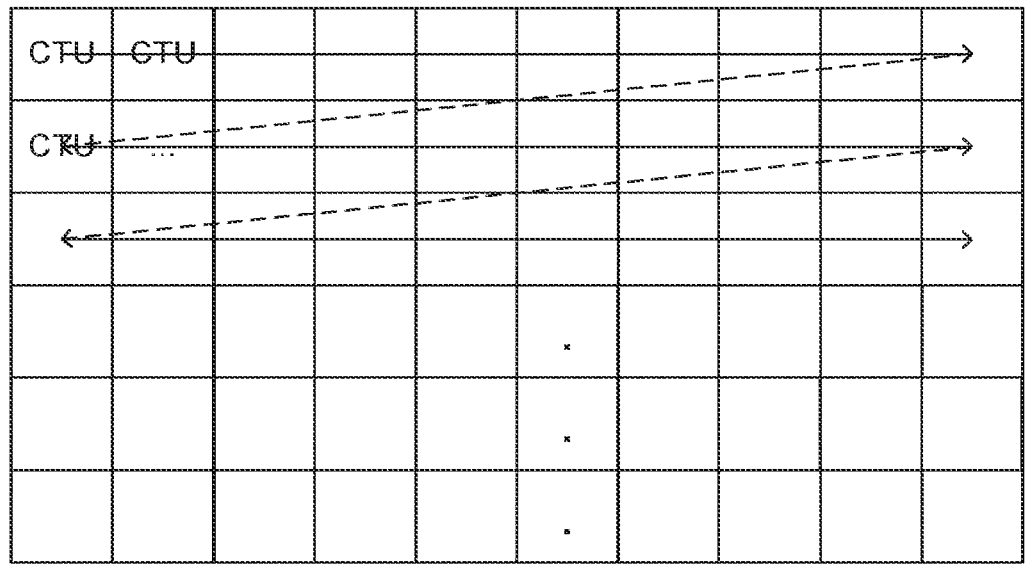
FIGS. 4A-4D are block diagrams illustrating how a frame is recursively quad-tree partitioned into multiple video blocks of different sizes in accordance with some implementations of the present disclosure.
Figure 4B:
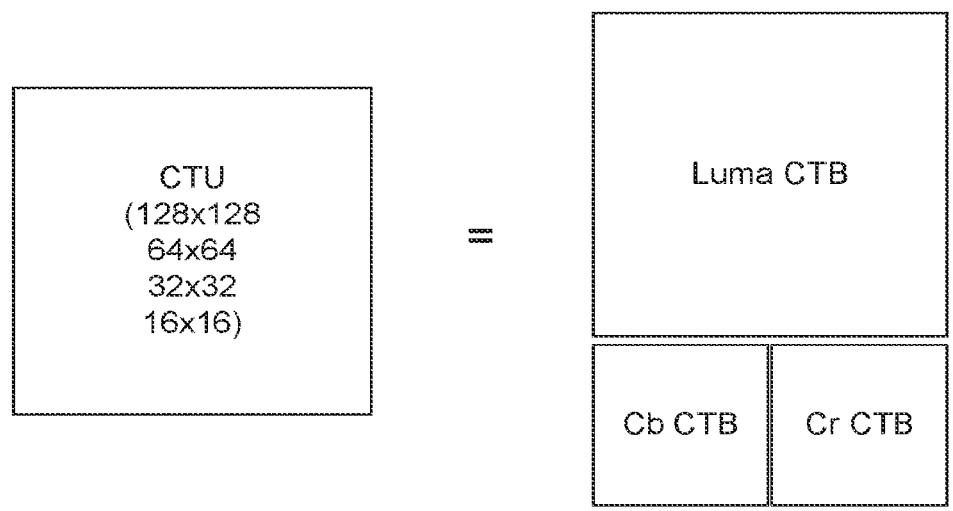

As shown in FIG. 4A, video encoder 20 (or more specifically partition unit 45) generates an encoded representation of a frame by first partitioning the frame into a set of coding tree units (CTUs). A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one coding tree block (CTB) of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
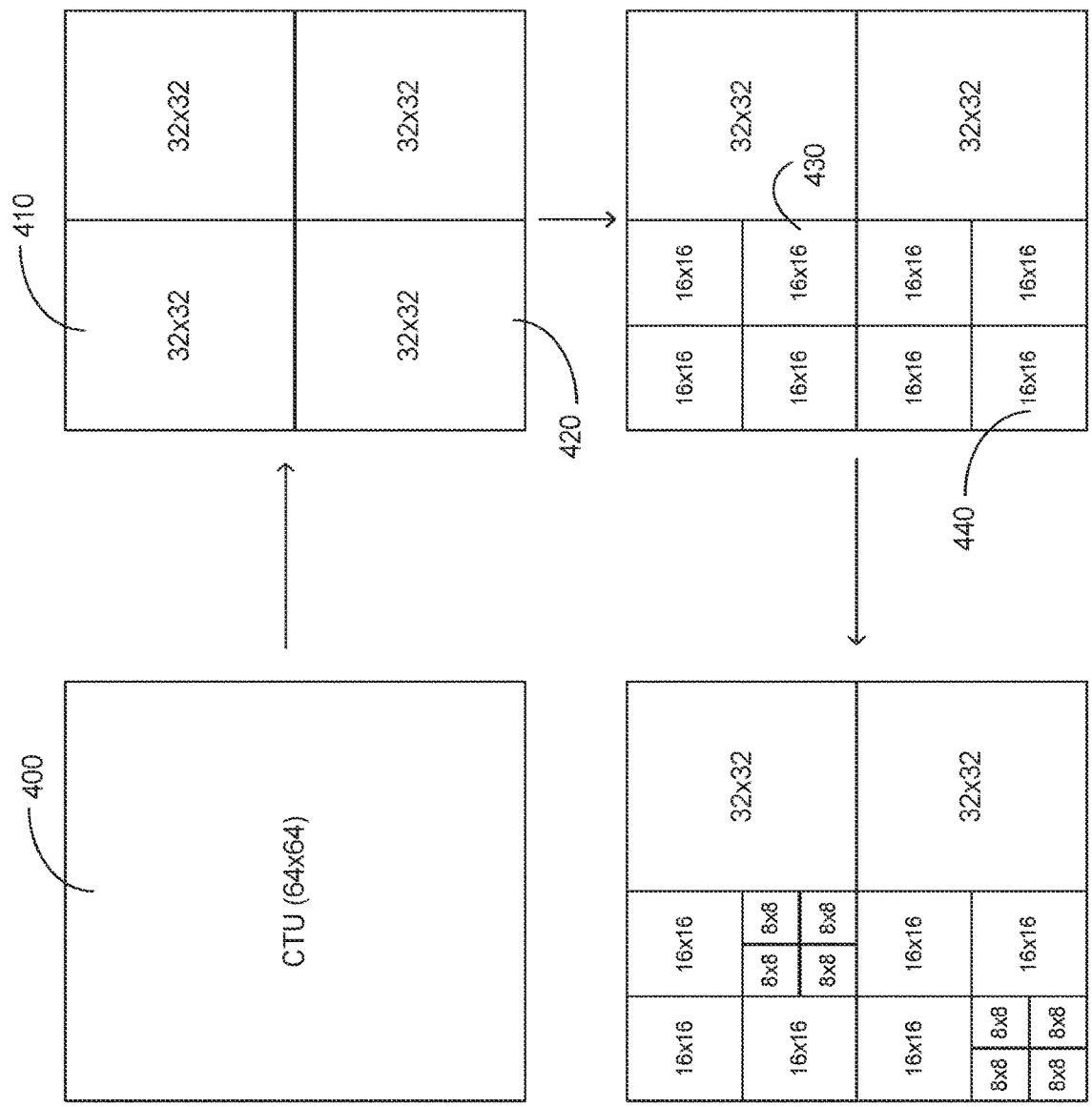
Figure 4D:
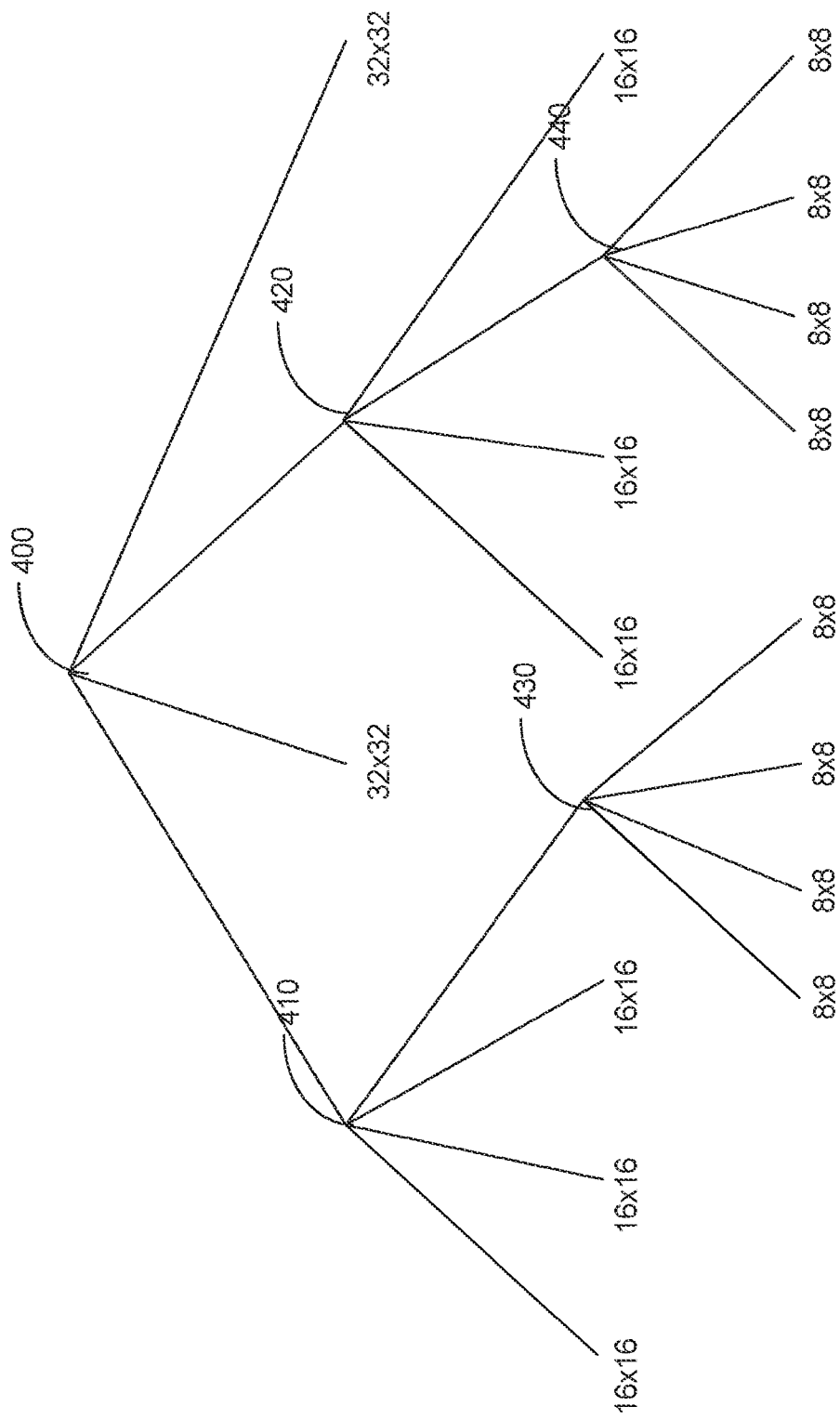

To achieve a better performance, video encoder 20 may recursively perform tree partitioning such as binary-tree partitioning, quad-tree partitioning or a combination of both on the coding tree blocks of the CTU and divide the CTU into smaller coding units (CUs). As depicted in FIG. 4C, the 64×64 CTU 400 is first divided into four smaller CU, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a coding block (CB) of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block.

In some implementations, video encoder 20 may further partition a coding block of a CU into one or more M×N prediction blocks (PB). A prediction block is a rectangular (square or non-square) block of samples on which the same prediction, inter or intra, is applied. A prediction unit (PU) of a CU may comprise a prediction block of luma samples, two corresponding prediction blocks of chroma samples, and syntax elements used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the frame associated with the PU. If video encoder 20 uses inter prediction to generate the predictive blocks of a PU, video encoder 20 may generate the predictive blocks of the PU based on decoded samples of one or more frames other than the frame associated with the PU.

After video encoder 20 generates predictive luma, Cb, and Cr blocks for one or more PUs of a CU, video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, video encoder 20 may use quad-tree partitioning to decompose the luma, Cb, and Cr residual blocks of a CU into one or more luma, Cb, and Cr transform blocks. A transform block is a rectangular (square or non-square) block of samples on which the same transform is applied. A transform unit (TU) of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Finally, video encoder 20 may output a bitstream that includes a sequence of bits that forms a representation of coded frames and associated data, which is either saved in storage device 32 or transmitted to destination device 14.

After receiving a bitstream generated by video encoder 20, video decoder 30 may parse the bitstream to obtain syntax elements from the bitstream. Video decoder 30 may reconstruct the frames of the video data based at least in part on the syntax elements obtained from the bitstream. The process of reconstructing the video data is generally reciprocal to the encoding process performed by video encoder 20. For example, video decoder 30 may perform inverse transforms on the coefficient blocks associated with TUs of a current CU to reconstruct residual blocks associated with the TUs of the current CU. Video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). It is noted that IBC could be regarded as either intra-frame prediction or a third mode. Between the two modes, inter-frame prediction contributes more to the coding efficiency than intra-frame prediction because of the use of motion vectors for predicting a current video block from a reference video block.

But with the ever improving video data capturing technology and more refined video block size for preserving details in the video data, the amount of data required for representing motion vectors for a current frame also increases substantially. One way of overcoming this challenge is to benefit from the fact that not only a group of neighboring CUs in both the spatial and temporal domains have similar video data for predicting purpose but the motion vectors between these neighboring CUs are also similar. Therefore, it is possible to use the motion information of spatially neighboring CUs and/or temporally collocated CUs as an approximation of the motion information (e.g., motion vector) of a current CU by exploring their spatial and temporal correlation, which is also referred to as "motion vector predictor" (MVP) of the current CU.

Instead of encoding, into the video bitstream, an actual motion vector of the current CU determined by motion estimation unit 42 as described above in connection with FIG. 2, the motion vector predictor of the current CU is subtracted from the actual motion vector of the current CU to produce a motion vector difference (MVD) for the current CU. By doing so, there is no need to encode the motion vector determined by motion estimation unit 42 for each CU of a frame into the video bitstream and the amount of data used for representing motion information in the video bitstream can be significantly decreased.

Like the process of choosing a predictive block in a reference frame during inter-frame prediction of a code block, a set of rules need to be adopted by both video encoder 20 and video decoder 30 for constructing a motion vector candidate list (also known as a "merge list") for a current CU using those potential candidate motion vectors associated with spatially neighboring CUs and/or temporally collocated CUs of the current CU and then selecting one member from the motion vector candidate list as a motion vector predictor for the current CU. By doing so, there is no need to transmit the motion vector candidate list itself between video encoder 20 and video decoder 30 and an index of the selected motion vector predictor within the motion vector candidate list is sufficient for video encoder 20 and video decoder 30 to use the same motion vector predictor within the motion vector candidate list for encoding and decoding the current CU.

In some implementations, each inter-prediction CU has three motion vector prediction modes including inter (which is also referred to as "advanced motion vector prediction" (AMVP)), skip, and merge for constructing the motion vector candidate list. Under each mode, one or more motion vector candidates may be added to the motion vector candidate list according to the algorithms described below. Ultimately one of them in the candidate list is used as the best motion vector predictor of the inter-prediction CU to be encoded into the video bitstream by video encoder 20 or decoded from the video bitstream by video decoder 30. To find the best motion vector predictor from the candidate list, a motion vector competition (MVC) scheme is introduced to select a motion vector from a given candidate set of motion vectors, i.e., the motion vector candidate list, that includes spatial and temporal motion vector candidates.

In addition to deriving motion vector predictor candidates from spatially neighboring or temporally collocated CUs, the motion vector predictor candidates can also be derived from the so-called "history-based motion vector prediction" (HMVP) table. The HMVP table houses a predefined number of motion vector predictors, each having been used for encoding/decoding a particular CU of the same row of CTUs (or sometimes the same CTU). Because of the spatial/temporal proximity of these CUs, there is a high likelihood that one of the motion vector predictors in the HMVP table may be reused for encoding/decoding different CUs within the same row of CTUs. Therefore, it is possible to achieve a higher code efficiency by including the HMVP table in the process of constructing the motion vector candidate list.

In some implementations, the HMVP table has a fixed length (e.g., 5) and is managed in a quasi-First-In-First-Out (FIFO) manner. For example, a motion vector is reconstructed for a CU when decoding one inter-coded block of the CU. The HMVP table is updated on-the-fly with the reconstructed motion vector because such motion vector could be the motion vector predictor of a subsequent CU. When updating the HMVP table, there are two scenarios: (i) the reconstructed motion vector is different from other existing motion vectors in the HMVP table or (ii) the reconstructed motion vector is the same as one of the existing motion vectors in the HMVP table. For the first scenario, the reconstructed motion vector is added to the HMVP table as the newest one if the HMVP table is not full. If the HMVP table is already full, the oldest motion vector in the HMVP table needs to be removed from the HMVP table first before the reconstructed motion vector is added as the newest one. In other words, the HMVP table in this case is similar to a FIFO buffer such that the motion information located at the head of the FIFO buffer and associated with another previously inter-coded block is shifted out of the buffer so that the reconstructed motion vector is appended to the tail of the FIFO buffer as the newest member in the HMVP table. For the second scenario, the existing motion vector in the HMVP table that is substantially identical to the reconstructed motion vector is removed from the HMVP table before the reconstructed motion vector is added to the HMVP table as the newest one. If the HMVP table is also maintained in the form of a FIFO buffer, the motion vector predictors after the identical motion vector in the HMVP table are shifted forward by one element to occupy the space left by the removed motion vector and the reconstructed motion vector is then appended to the tail of the FIFO buffer as the newest member in the HMVP table.

The motion vectors in the HMVP table could be added to the motion vector candidate lists under different prediction modes such as AMVP, merge, skip, etc. It has been found that the motion information of previously inter-coded blocks stored in the HMVP table even not adjacent to the current block can be utilized for more efficient motion vector prediction.

After one MVP candidate is selected within the given candidate set of motion vectors for a current CU, video encoder 20 may generate one or more syntax elements for the corresponding MVP candidate and encode them into the video bitstream such that video decoder 30 can retrieve the MVP candidate from the video bitstream using the syntax elements. Depending on the specific mode used for constructing the motion vectors candidate set, different modes (e.g., AMVP, merge, skip, etc.) have different sets of syntax elements. For the AMVP mode, the syntax elements include inter prediction indicators (List 0, List 1, or bi-directional prediction), reference indices, motion vector candidate indices, motion vector prediction residual signal, etc. For the skip mode and the merge mode, only merge indices are encoded into the bitstream because the current CU inherits the other syntax elements including the inter prediction indicators, reference indices, and motion vectors from a neighboring CU referred by the coded merge index. In the case of a skip coded CU, the motion vector prediction residual signal is also omitted.

FIG. 5A is a block diagram illustrating spatially neighboring and temporally collocated block positions of a current CU to be encoded/decoded in accordance with some implementations of the present disclosure. For a given mode, a motion vector prediction (MVP) candidate list is constructed by first checking the availability of motion vectors associated with the spatially left and above neighboring block positions, and the availability of motion vectors associated with temporally collocated block positions and then the motion vectors in the HMVP table. During the process of constructing the MVP candidate list, some redundant MVP candidates are removed from the candidate list and, if necessary, zero-valued motion vector is added to make the candidate list to have a fixed length (note that different modes may have different fixed lengths). After the construction of the MVP candidate list, video encoder 20 can select the best motion vector predictor from the candidate list and encode the corresponding index indicating the chosen candidate into the video bitstream.

Using FIG. 5A as an example and assuming that the candidate list has a fixed length of two, the motion vector predictor (MVP) candidate list for the current CU may be constructed by performing the following steps in order under the AMVP mode:
1) Selection of MVP candidates from spatially neighboring CUs
    a) Derive up to one non-scaled MVP candidate from one of the two left spatial neighbour CUs starting with A0 and ending with A1;
    b) If no non-scaled MVP candidate from left is available in the previous step, derive up to one scaled MVP candidate from one of the two left spatial neighbour CUs starting with A0 and ending with A1;
c) Derive up to one non-scaled MVP candidate from one of the three above spatial neighbour CUs starting with B0, then B1, and ending with B2;
d) If neither A0 nor A1 is available or if they are coded in intra modes, derive up to one scaled MVP candidate from one of the three above spatial neighbour CUs starting with B0, then B1, and ending with B2;
2) If two MVP candidates are found in the previous steps and they are identical, remove one of the two candidates from the MVP candidate list;
3) Selection of MVP candidates from temporally collocated CUs
a) If the MVP candidate list after the previous step does not include two MVP candidates, derive up to one MVP candidate from the temporal collocated CUs (e.g., T0)
4) Selection of MVP candidates from the HMVP table
a) If the MVP candidate list after the previous step does not include two MVP candidates, derive up to two history-based MVP from the HMVP table; and
5) If the MVP candidate list after the previous step does not include two MVP candidates, add up to two zero-valued MVPs to the MVP candidate list.

Since there are only two candidates in the AMVP-mode MVP candidate list constructed above, an associated syntax element like a binary flag is encoded into the bitstream to indicate that which of the two MVP candidates within the candidate list is used for decoding the current CU.

In some implementations, the MVP candidate list for the current CU under the skip or merge mode may be constructed by performing a similar set of steps in order like the ones above. It is noted that one special kind of merge candidate called "pair-wise merge candidate" is also included into the MVP candidate list for the skip or merge mode. The pair-wise merge candidate is generated by averaging the MVs of the two previously derived merge-mode motion vector candidates. The size of the merge MVP candidate list (e.g., from 1 to 6) is signaled in a slice header of the current CU. For each CU in the merge mode, an index of the best merge candidate is encoded using truncated unary binarization (TU). The first bin of the merge index is coded with context and bypass coding is used for other bins.

As mentioned above, the history-based MVPs can be added to either the AMVP-mode MVP candidate list or the merge MVP candidate list after the spatial MVP and temporal MVP. The motion information of a previously inter-coded CU is stored in the HMVP table and used as a MVP candidate for the current CU. The HMVP table is maintained during the encoding/decoding process. Whenever there is a non-sub-block inter-coded CU, the associated motion vector information is added to the last entry of the HMVP table as a new candidate while the motion vector information stored in the first entry of the HMVP table is removed from therein (if the HMVP table is already full and there is no identical duplicate of the associated motion vector information in the table). Alternatively, the identical duplicate of the associated motion vector information is removed from the table before the associated motion vector information is added to the last entry of the HMVP table.

As noted above, intra block copy (IBC) can significantly improve the coding efficiency of screen content materials. Since IBC mode is implemented as a block-level coding mode, block matching (BM) is performed at video encoder 20 to find an optimal block vector for each CU. Here, a block vector is used to indicate the displacement from the current block to a reference block, which has already been reconstructed within the current picture. An IBC-coded CU is treated as the third prediction mode other than the intra or inter prediction modes.

At the CU level, the IBC mode can be signaled as IBC AMVP mode or IBC skip/merge mode as follows:
IBC AMVP mode: a block vector difference (BVD) between the actual block vector of a CU and a block vector predictor of the CU selected from block vector candidates of the CU is encoded in the same way as a motion vector difference is encoded under the AMVP mode described above. The block vector prediction method uses two block vector candidates as predictors, one from left neighbor and the other one from above neighbor (if IBC coded). When either neighbor is not available, a default block vector will be used as a block vector predictor. A binary flag is signaled to indicate the block vector predictor index. The IBC AMVP candidate list consists of spatial and HMVP candidates.
IBC skip/merge mode: a merge candidate index is used to indicate which of the block vector candidates in the merge candidate list (also known as a "merge list") from neighboring IBC coded blocks is used to predict the block vector for the current block. The IBC merge candidate list consists of spatial, HMVP, and pairwise candidates.

Another approach of improving the coding efficiency adopted by the state-of-art coding standard is to introduce the parallel processing to the video encoding/decoding process using, e.g., a multi-core processor. For example, wavefront parallel processing (WPP) has already been introduced into HEVC as a feature of encoding or decoding of multiple rows CTUs in parallel using multiple threads.

Figure 5B:
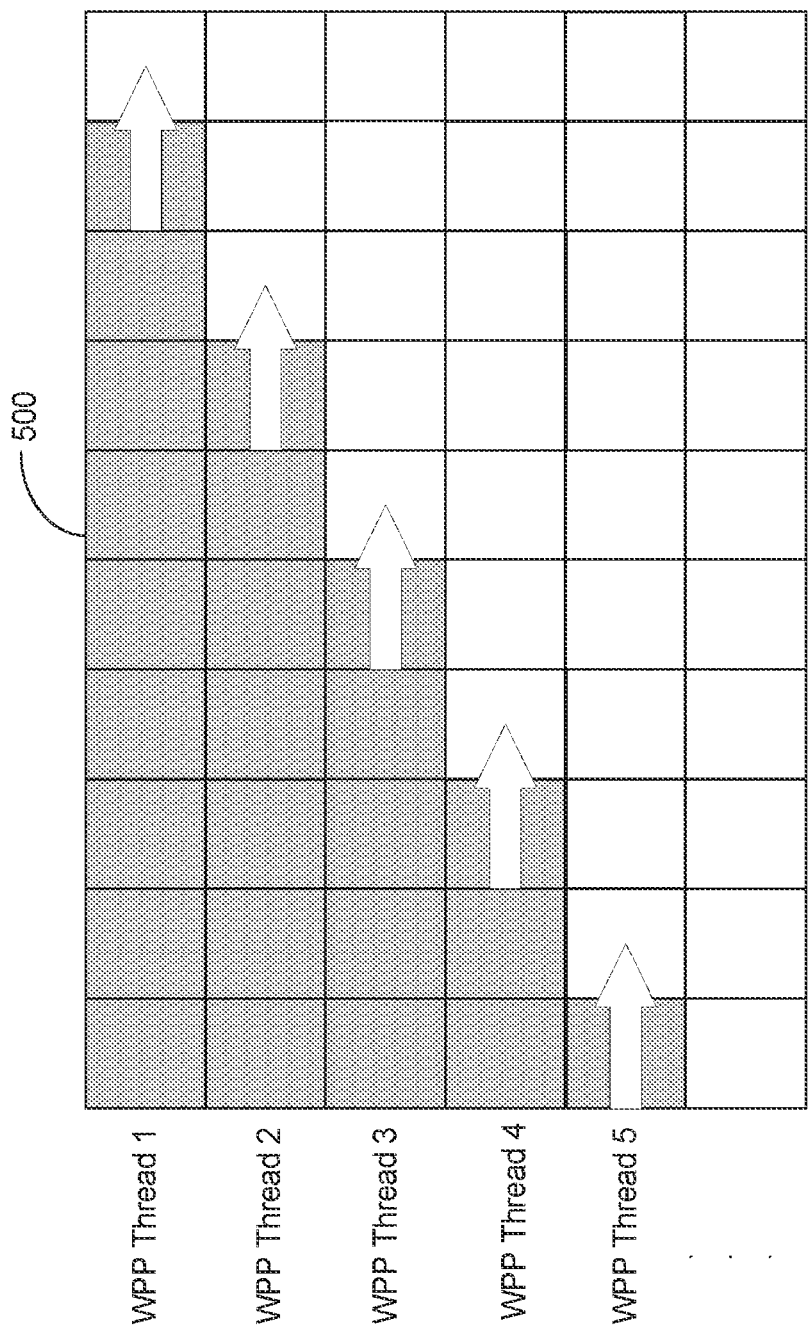
FIG. 5B is a block diagram illustrating multi-threaded encoding of multiple rows of CTUs of a picture using wavefront parallel processing in accordance with some implementations of the present disclosure.

FIG. 5B is a block diagram illustrating multi-threaded encoding of multiple rows of CTUs of a picture using wavefront parallel processing (WPP) in accordance with some implementations of the present disclosure. When WPP is enabled, it is possible to process multiple rows of CTUs in parallel in a wavefront fashion, where there may be a delay of two CTUs between the start of two neighboring wavefronts. For example, to code the picture 500 using WPP, a video coder, such as video encoder 20 and video decoder 30, may divide the coding tree units (CTUs) of the picture 500 into a plurality of wavefronts, each wavefront corresponding to a respective row of CTUs in the picture. The video coder may start coding a top wavefront, e.g., using a first coder core or thread. After the video coder has coded two or more CTUs of the top wavefront, the video coder may start coding a second-to-top wavefront in parallel with coding the top wavefront, e.g., using a second, parallel coder core or thread. After the video coder has coded two or more CTUs of the second-to-top wavefront, the video coder may start coding a third-to-top wavefront in parallel with coding the higher wavefronts, e.g., using a third, parallel coder core or thread. This pattern may continue down the wavefronts in the picture 500. In the present disclosure, a set of CTUs that a video coder is concurrently coding, using WPP, is referred to as a "CTU group." Thus, when the video coder uses WPP to code a picture, each CTU of the CTU group may belong to a unique wavefront of the picture and the CTU may be offset from a CTU in a respective, above wavefront by at least two columns of CTUs of the picture.

The video coder may initialize a context for a current wavefront for performing context adaptive binary arithmetic coding (CABAC) of the current wavefront based on data of the first two blocks of the above wavefront, as well as one or more elements of a slice header for a slice including the first code block of the current wavefront. The video coder may perform CABAC initialization of a subsequent wavefront (or CTU row) using the context states after coding two CTUs of a CTU row above the subsequent CTU row. In other words, before beginning coding of a current wavefront, a video coder (or more specifically, a thread of the video coder) may code at least two blocks of a wavefront above the current wavefront, assuming the current wavefront is not the top row of CTUs of a picture. The video coder may then initialize a CABAC context for the current wavefront after coding at least two blocks of a wavefront above the current wavefront. In this example, each CTU row of the picture 500 is a separated partition and has an associated thread (WPP Thread 1, WPP Thread 2, . . . ) such that the number of CTU rows in the picture 500 can be encoded in parallel.

Because the current implementation of the HMVP table uses a global motion vector (MV) buffer to store previously reconstructed motion vectors, this HMVP table cannot be implemented on the WPP-enabled parallel encoding scheme described above in connection with FIG. 5B. In particular, the fact that the global MV buffer is shared by all the threads of the encoding/decoding process of a video coder prevents the WPP threads after the first WPP thread (i.e., WPP Thread 1) from being started since these WPP threads have to wait for the HMVP table update from the last CTU (i.e., rightmost CTU) of the first WPP thread (i.e., the first CTU row) to be completed.

To overcome the problem, it is proposed that the global MV buffer shared by the WPP threads be replaced with multiple CTU row-dedicated buffers such that each wavefront of CTU row has its own buffer for storing an HMVP table corresponding to the CTU row being processed by a corresponding WPP thread when WPP is enabled at the video coder. It is noted that each CTU row having its own HMVP table is equivalent to resetting the HMVP table before coding a first CU of the CTU row. The HMVP table reset is to flush out all the motion vectors in the HMVP table resulting from coding of another CTU row. In one implementation, the reset operation is to set the size of the available motion vector predictors in the HMVP table to be zero. In yet another implementation, the reset operations could be to set the reference index of all the entries in the HMVP table to be an invalid value such as −1. By doing so, the construction of MVP candidate list for a current CTU within a particular wavefront, regardless of which one of the three modes, AMVP, merge, and skip, is dependent upon an HMVP table associated with a WPP thread processing the particular wavefront. There is no inter-dependency between different wavefronts other than the two-CTU delay described above and the construction of motion vector candidate lists associated with different wavefronts can proceed in parallel like the WPP process depicted in FIG. 5B. In other words, at the beginning of processing a particular wavefront, the HMVP table is reset to be empty without affecting the coding of another wavefront of CTUs by another WPP thread. In some cases, the HMVP table can be reset to be empty before the coding of each individual CTU. In this case, the motion vectors in the HMVP table are limited to a particular CTU and there is probably a higher chance of a motion vector within the HMVP table being selected as a motion vector of a current CU within the particular CTU.

Figure 5C:
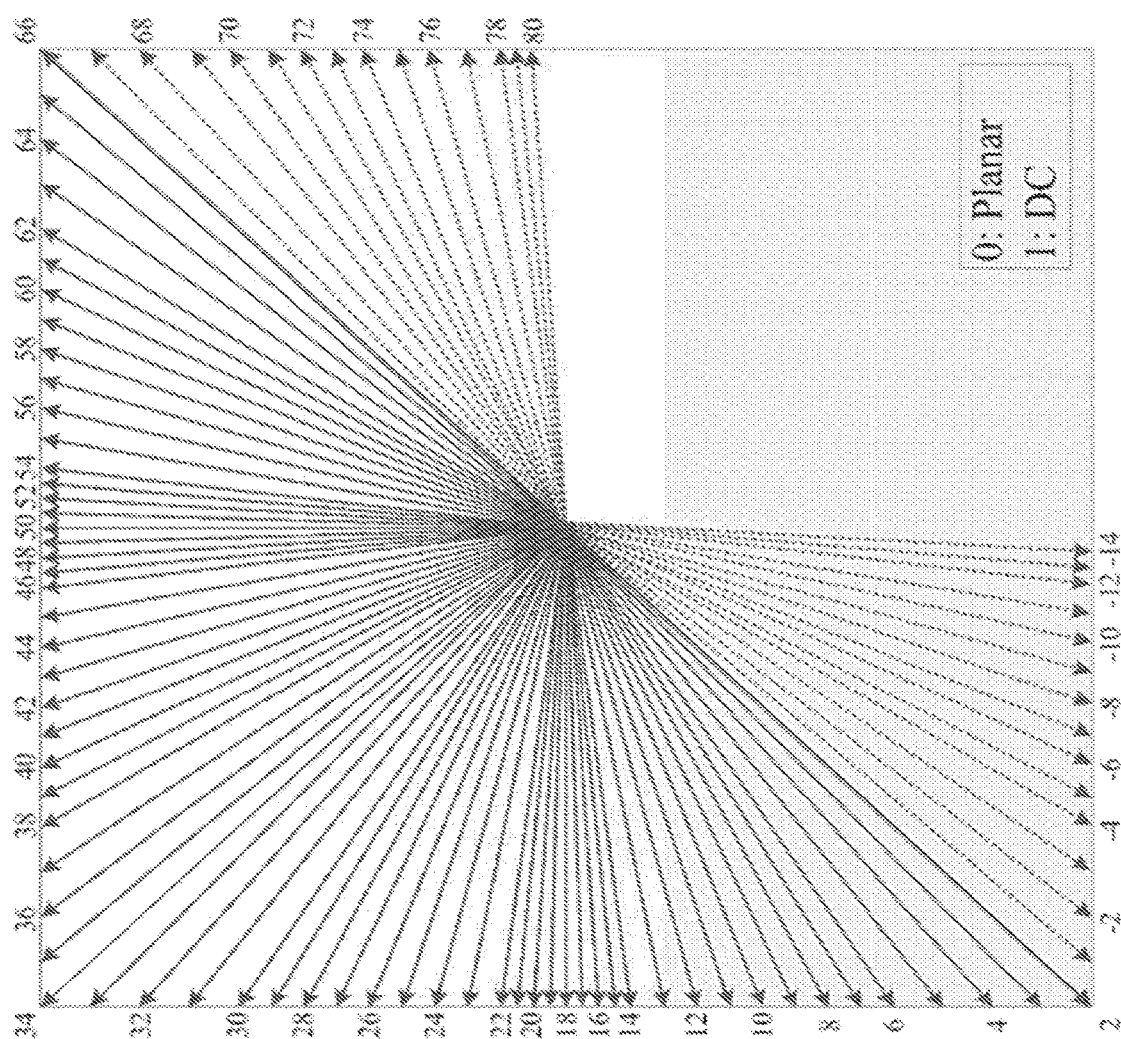
FIG. 5C is a block diagram illustrating intra modes as defined in the VVC standard in accordance with some implementations of the present disclosure.
Figure 5D:
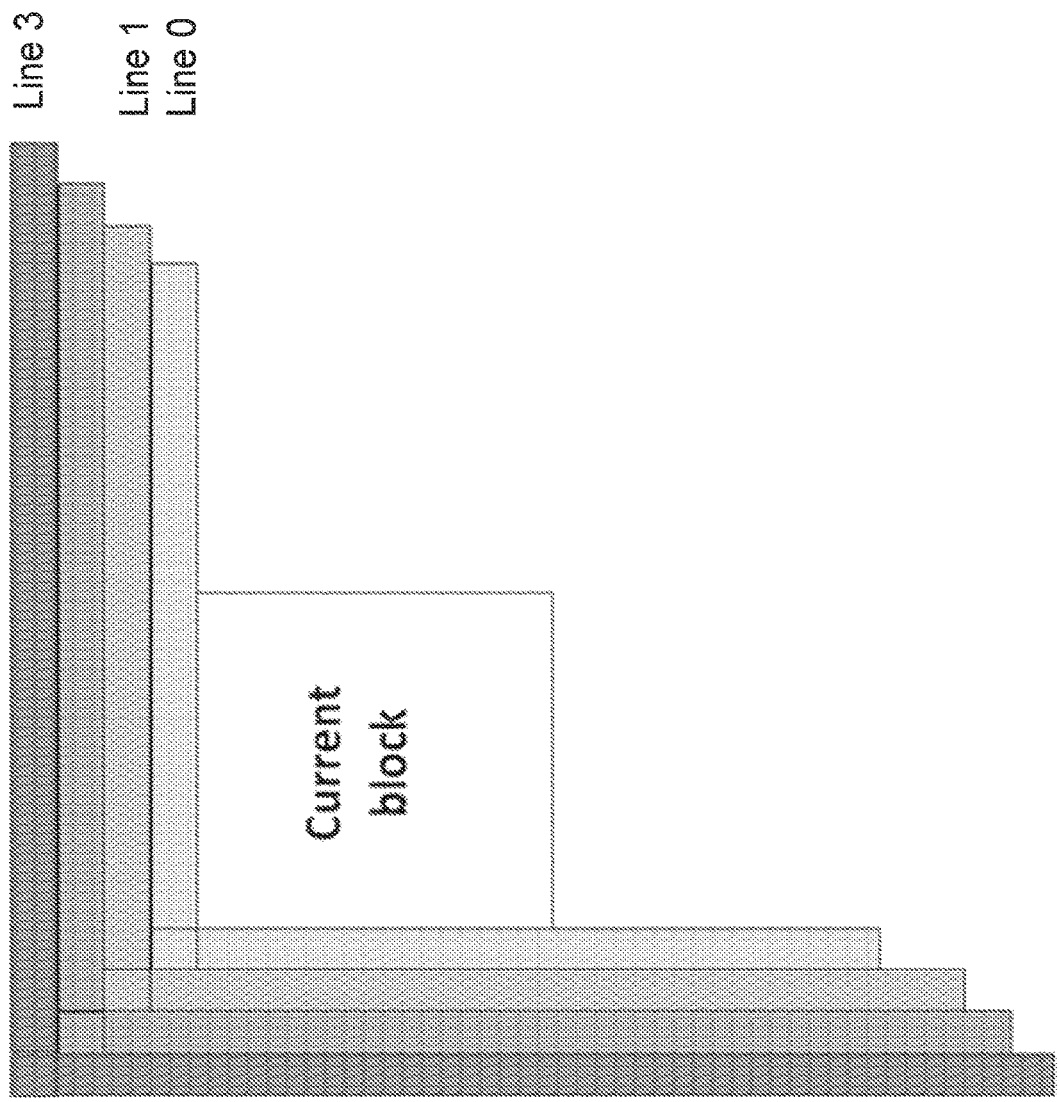
FIG. 5D is a block diagram illustrating a set of neighboring reconstructed samples above and left to the current block as the reference for intra prediction in accordance with some implementations of the present disclosure.

In some examples, intra prediction modes with wide-angle intra directions are further described herein. A set of previously decoded samples neighboring to one current CU (i.e., above or left) to predict the samples of the CU is used. However, to capture finer edge directions present in natural video (especially for video content in high resolutions, e.g., 4K), the number of angular intra modes is extended from 33 in the HEVC to 93 in the VVC. In addition to angular directions, planar mode (which assumes a gradual changing surface with horizontal and vertical slope derived from boundaries) and DC mode (which assumes a flat surface) are also applied. FIG. 5C is a block diagram illustrating intra modes as defined in the VVC standard in accordance with some implementations of the present disclosure. FIG. 5D is a block diagram illustrating a set of neighboring reconstructed samples above and left to the current block as the reference for intra prediction in accordance with some implementations of the present disclosure. All the intra modes (i.e., planar, DC and angular directions) utilize a set of neighboring reconstructed samples above and left to the predicted block as the reference for intra prediction. However, in some embodiments, different from the method where only the nearest row/column (i.e., line 0 in FIG. 5D) of reconstructed samples are as reference, multi reference line (MRL) is introduced where two additional rows/columns (for example, line 1 and line 3 in FIG. 5D) are used for the intra prediction. The index of the selected reference row/column is signaled from encoder to decoder. In some examples, when non-nearest row/column is selected, planar and DC modes are excluded from the set of intra modes that can be used to predict the current block.

In some examples, in the Decoder-side Intra Mode Derivation(DIMD) mode, the intra prediction mode is no longer searched at the encoder but rather derived using previously encoded neighboring pixels through a gradient analysis. DIMD is signaled for intra coded blocks using a simple flag. At the decoder, if the DIMD flag is true, the intra prediction mode is derived in the reconstruction process using the same previously encoded neighboring pixels. If not, the intra prediction mode is parsed from the bitstream as that in classical intra coding mode.

Figure 5E:
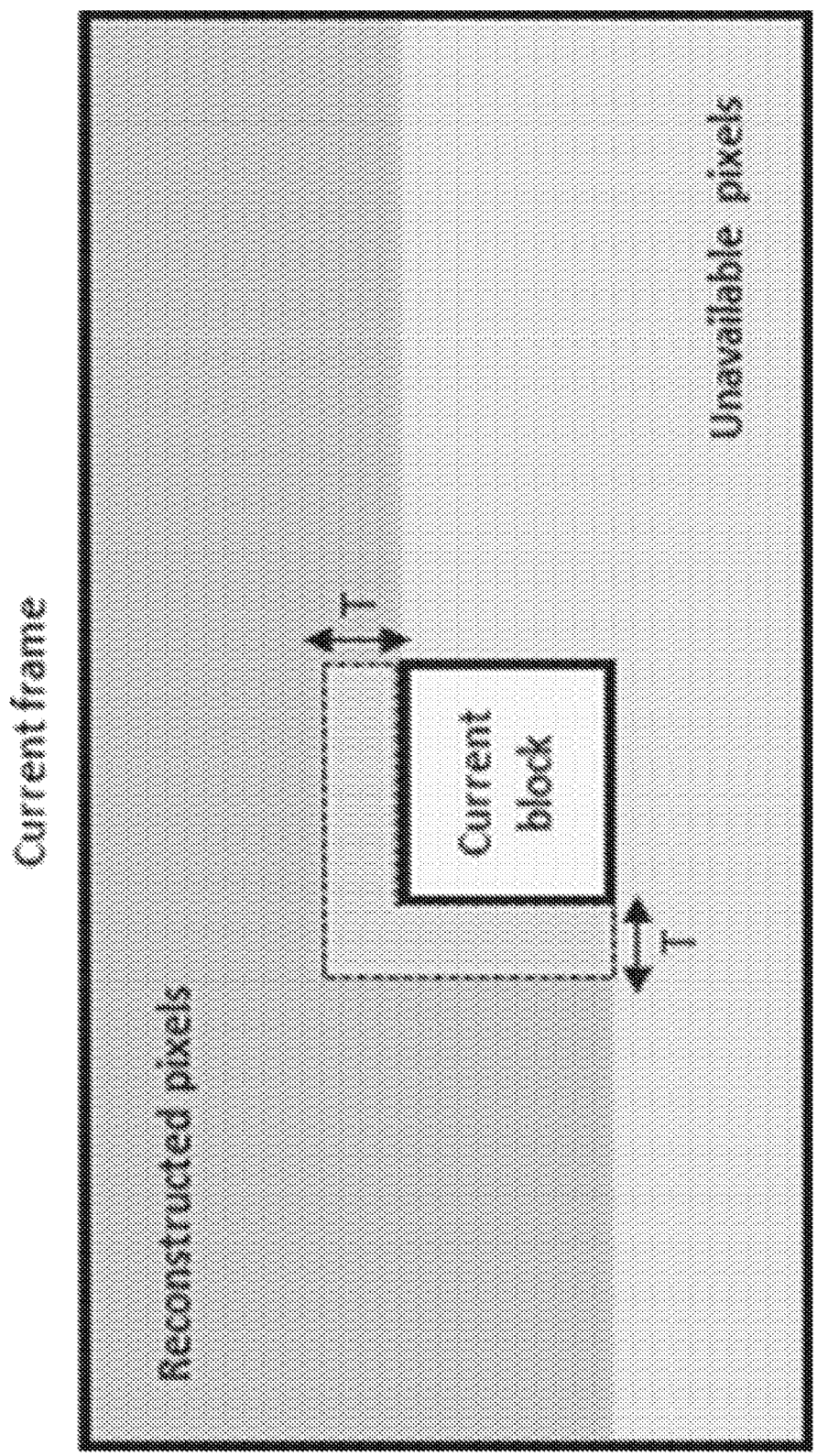
FIG. 5E is a block diagram illustrating a set of chosen pixels on which a gradient analysis is performed in accordance with some implementations of the present disclosure.

To derive the intra prediction mode for a block, a set of neighboring pixels must be first selected, on which a gradient analysis is performed. For the normativity purposes, these pixels should be in the decoded/reconstructed pool of pixels. FIG. 5E is a block diagram illustrating a set of chosen pixels on which a gradient analysis is performed in accordance with some implementations of the present disclosure. As shown in FIG. 5E, a template is chosen by surrounding the current block by T pixels to the left, and T pixels above (on the top). Next, a gradient analysis is performed on the pixels of the template. This allows a determination of a main angular direction for the template, which is assumed to have a high chance to be identical to the current block. This assumption is the core premise of this method. Thus a simple 3×3 Sobel gradient filter is used, which is defined by the following matrices that will be convoluted with the template:

$$M_x = \begin{bmatrix} -1 & 0 & 1 \\ -2 & 0 & 2 \\ -1 & 0 & 1 \end{bmatrix} \text{ and } M_y = \begin{bmatrix} -1 & -2 & -1 \\ 0 & 0 & 0 \\ 1 & 2 & 1 \end{bmatrix}$$

For each pixel of the template, each of these two matrices is point by point multiplied with the 3×3 window centered around the current pixel and composed of 8 direct neighbors, and the results are summed. Thus, two values Gx (from the multiplication with Mx) and Gy (from the multiplication with My) are obtained corresponding to the gradients at the current pixel, in the horizontal and vertical directions respectively.

Figure 5F:
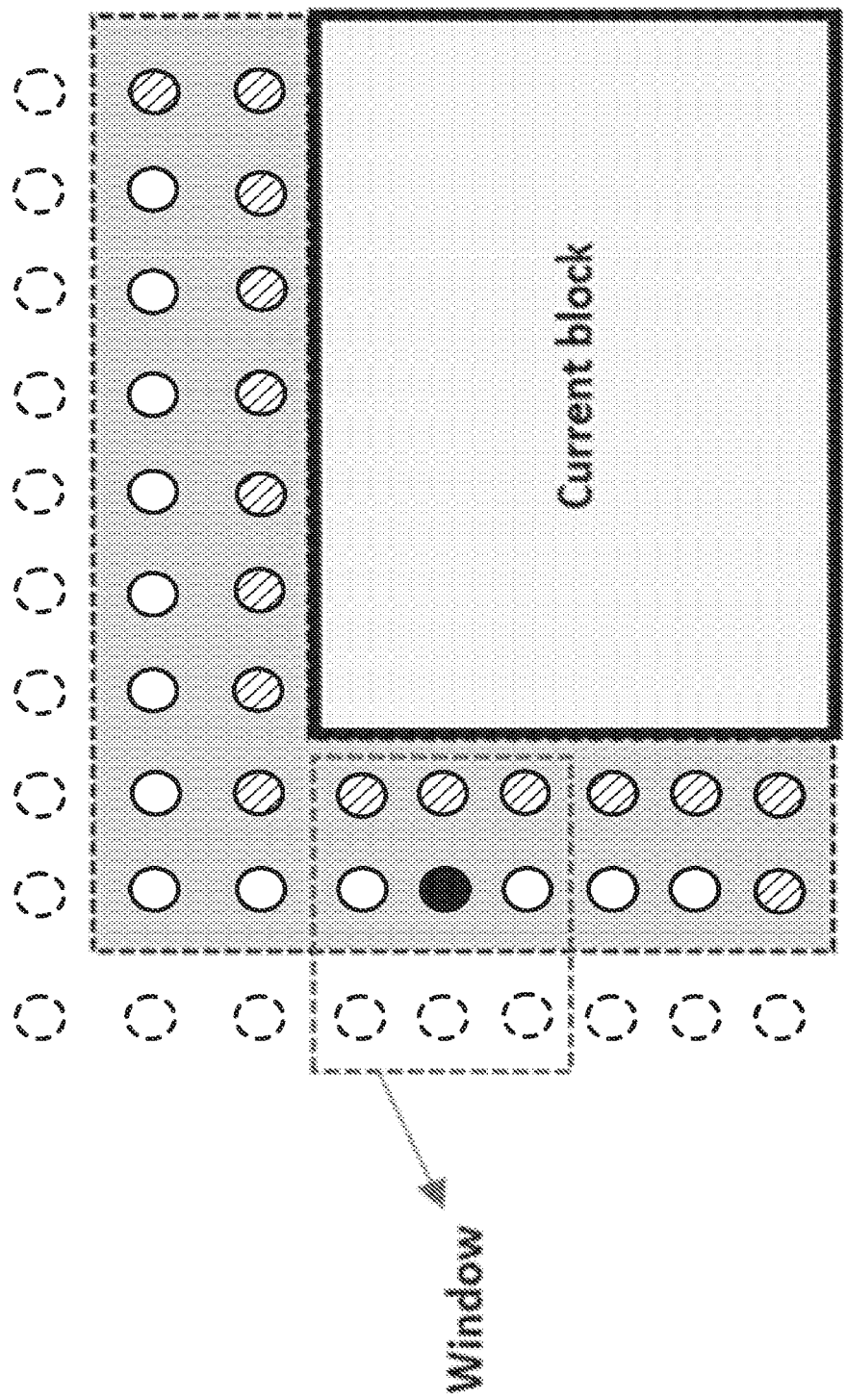
FIG. 5F is a block diagram illustrating the convolution process of the 3×3 Sobel gradient filter with the template in accordance with some implementations of the present disclosure.

FIG. 5F is a block diagram illustrating the convolution process of the 3×3 Sobel gradient filter with the template (as shown in FIG. 5E) in accordance with some implementations of the present disclosure. The black pixel is the current pixel. The white (and the black) pixels are the pixels on which the gradient analysis is possible. The pixels with slash gradient are the pixels on which the gradient analysis is not possible due to the lack of some neighbors. The dash-outlined pixels are available (reconstructed) pixels outside of the considered template, which is used in the gradient analysis of the red pixels. In case a dash-outlined pixel is not available (due to the blocks being too close to the border of a picture for instance), the gradient analysis of the white pixels that use this dash-outlined pixel is not performed. For each white pixel, the intensity (G) and the orientation (O) of the gradient are computed using Gx and Gy as such:

$$G = |G_x| + |G_y| \text{ and } O = \text{atan}\left(\frac{G_y}{G_x}\right)$$

The orientation of the gradient is then converted into an intra angular prediction mode, which is used to index a histogram. Being initialized to zero, the histogram value at the intra angular mode is increased by G. Once all the red pixels in the template are processed, the histogram contains cumulative values of gradient intensities, for each intra angular mode. The mode that shows the highest peak in the histogram is selected as the intra prediction mode for the current block. If the maximum value in the histogram is 0 (meaning no gradient analysis was able to be performed, or the area composing the template is flat), the DC mode is selected as the intra prediction mode for the current block.

FIGS. 6A and 6B are block diagrams illustrating an exemplary previously-reconstructed luma block 602 and an exemplary corresponding to-be-reconstructed chroma block 620, respectively, in accordance with some implementations of the present disclosure. In this example, luma samples of previously-reconstructed luma block 602 (e.g., including luma sample 604), top neighboring luma group 606 (e.g., including luma sample 608), and left neighboring luma group 610 (e.g., including luma sample 615) have been predicted during a video coding process. Chroma samples of chroma block 620 (e.g., including chroma sample 622) are to be predicted, while chroma samples of top neighboring chroma group 624 (e.g., including chroma sample 626) and left neighboring chroma group 628 (e.g., including chroma sample 630) have been previously-reconstructed during the video coding process. In some embodiments, if luma block 602 and chroma block 620 are of different size and shape, chroma samples of chroma block 620 can be predicted by applying a multi-model linear model (MMLM) to the corresponding down-sampled luma samples (e.g., down-sampled luma sample 605) of previously-reconstructed luma block 602 along with chroma samples of top neighboring chroma group 624 (e.g., including chroma sample 626) and left neighboring chroma group 628 (e.g., including chroma sample 630). Derivation and application of the MMLM are provided below in connection with FIGS. 7A-7D.

In some embodiments, previously-reconstructed luma block 602 and chroma block 620 each represents a different component of a portion of a video frame. For example, in the YCbCr color space, an image is represented by a luma component (Y), a blue-difference chroma component (Cb), and a red-difference chroma component (Cr). Previously-reconstructed luma block 602 represents the luma component (i.e., brightness) of a portion of the video frame, and chroma block 620 represents a chroma component (i.e., color) of the same portion of the video frame. A luma sample (e.g., luma sample 604) of previously-reconstructed luma block 602 has a luma value representing the brightness at a particular pixel of the video frame, and a chroma sample (e.g., chroma sample 622) has a chroma value representing the color at a particular pixel of the video frame.

In some embodiments, previously-reconstructed luma block 602 is a 2M×2N block with 2M luma samples across the block width and 2N luma samples across the block height. For example, "M" and "N" can be the same value (e.g., previously-reconstructed luma block 602 is a square block) or different values (e.g., previously-reconstructed luma block 602 is a non-square block).

Chroma subsampling is a common compression technique as the human visual system is less sensitive to the color difference than to brightness difference. As a result, previously-reconstructed luma block 602 and chroma block 620 may represent the same portion of a video frame but are encoded with different resolutions. For example, the video frame may have been encoded using a chroma subsampling scheme (e.g., 4:2:0 or 4:2:2) to encode for chroma information than for luma information with less resolution. As illustrated in FIGS. 6A and 6B, previously-reconstructed luma block 602 is encoded with a resolution of 2M×2N, while chroma block 620 is encoded with a smaller resolution of M×N. In practice, chroma block 620 can have other resolution such as 2M×2N (e.g., 4:4:4 full sampling), 2M×N (e.g., 4:4:0 sub-sampling), M×2N (e.g., 4:2:2 sub-sampling), and ½ M×2N (e.g., 4:1:1 sub-sampling).

Previously-reconstructed luma block 602 is next to top neighboring luma group 606 and left neighboring luma group 610. The size of top neighboring luma group 606 and left neighboring luma group 610 can be explicitly signaled or dependent upon the size of previously-reconstructed luma block 602. For example, top neighboring luma group 606 can have a width of 2M samples (e.g., same as the width of previously-reconstructed luma block 602) or 4M samples (e.g., double that of the width of previously-reconstructed luma block 602), and a height of 2 samples. Left neighboring luma group 610 can have a width of 2 samples, with a height of 2N or 4N samples. In some embodiments, top neighboring luma group 606 and left neighboring luma group 610 are each a portion of another luma block or blocks of the same video frame that has been reconstructed.

Chroma block 620 is next to top neighboring chroma group 624 and left neighboring group 628. The size of top neighboring chroma group 624 and left neighboring group 628 can be explicitly signaled or dependent upon the size of chroma block 620. For example, top neighboring chroma group 624 can have a size of 1×M or 1×2M, and left neighboring chroma group 628 can have a size of N×1 or 2N×1.

In some embodiments, chroma values (e.g., chroma values of chroma samples in chroma block 620) can be predicted based on the luma values of corresponding reconstructed luma samples (e.g., luma values of luma samples in previously-reconstructed luma block 602). For example, under the assumption that there exists a linear or quasi-linear relation between luma values and corresponding chroma values of a coding unit, a video coder can predict chroma values based on corresponding reconstructed luma values using the MMLM. By doing so, the video coder can save a significant amount of time and bandwidth for encoding the chroma values, transmitting the encoded chroma values, and decoding the encoded chroma values. To use the MMLM to predict unknown chroma values of chroma samples from known luma values of luma samples, the video coder (1) derives a group of linear relations (e.g., two or more) between the known chroma values of chroma samples and the known luma values of the corresponding luma samples in a coding block (with each linear relation applicable to luma values and/or chroma values in a particular range), and (2) predict unknown chroma values of the chroma samples by applying the appropriate linear relations to the known luma values of the corresponding previously-reconstructed luma samples. Refer to FIGS. 7A-7D, 8, and the related description for detail on how a video coder uses the MMLM to predict unknown chroma values from the known luma values of the corresponding previously-reconstructed luma samples.

In some embodiments, since luma blocks and chroma blocks are of different resolutions (e.g., the chroma blocks may have been sub-sampled), the video coder first performs down-sampling on luma samples to generate down-sampled luma samples (e.g., down-sampled luma sample 605, 609, and 613) that uniquely correspond to respective chroma samples. In some embodiments, when using the MMLM to predict unknown chroma values of chroma samples, the video coder applies the linear relations to the known luma values of the down-sampled luma samples (e.g., each of which uniquely corresponds to a respective chroma sample) instead of the known luma values of the actual luma samples. In some embodiments, six neighboring reconstructed luma samples in both height and width directions of the video frame are used to generate a down-sampled chroma sample, e.g., using weighted-averaging schemes known in the art including six-tap down-sampling or like. For example, the six reconstructed luma samples within region 611 (each represented by a small box in the figure) inside top neighboring luma group are used to generate down-sampled chroma sample 609 through weighted-averaging of their corresponding luma values, and the six reconstructed luma samples within region 607 (each represented by a small box in the figure) inside previously-reconstructed luma block 602 are used to generate down-sampled chroma sample 605.

For example, an application of an MMLM with two linear relations can be represented as:

$$\begin{cases} pred_C(i,j) = \alpha_1 \cdot rec'_L(i,j) + \beta_1 & \text{if } rec'_L(i,j) \le \text{Threshold} \\ pred_C(i,j) = \alpha_2 \cdot rec'_L(i,j) + \beta_2 & \text{if } rec'_L(i,j) > \text{Threshold} \end{cases} \quad \text{(Equation 1)}$$

in which $pred_C(i,j) pred_C(i,j)$ represents a predicted chroma value of a chroma sample (e.g., chroma sample 622) in a coding unit, and $rec_L'(i,j)$ represents a known luma value of a corresponding previously-reconstructed luma sample of the same coding unit. In some embodiments, $rec_L'(i,j)$ represents a known luma value of a down-sampled luma sample (e.g., down-sampled luma sample 605) of the same coding unit, which is determined based on previously-reconstructed luma samples (e.g., six-tap down-sampling). Threshold represents a threshold value that determines which of the multiple linear relations of the MMLM is to be used for a particular luma value. For the derivation of the MMLM including two linear relations (e.g., derivation of the linear model parameters $\alpha_1, \alpha_2, \beta_1, \beta_2$, Threshold), refer to FIGS. 7A-7D, 8, and the related description.

In another example, an application of an MMLM with three linear relations can be represented as:

$$\begin{cases} pred_C(i,j) = \alpha_1 \cdot rec'_L(i,j) + \beta_1 & \text{if } rec'_L(i,j) \le \text{Threshold}_1 \\ pred_C(i,j) = \alpha_2 \cdot rec'_L(i,j) + \beta_2 & \text{if } rec'_L(i,j) > \text{Threshold}_1 \text{ and} \\ & rec'_L(i,j) \le \text{Threshold}_2 \\ pred_C(i,j) = \alpha_3 \cdot rec'_L(i,j) + \beta_3^e & \text{if } rec'_L(i,j) > \text{Threshold}_2 \end{cases} \quad \text{(Equation 2)}$$

Equation 2 is different from Equation 1 in that the MMLM in Equation 2 includes three different linear relations, with two threshold values determining three separate ranges of luma values. For the derivation of the MMLM including three linear relations (e.g., derivation of the parameters ($\alpha_1$, $\alpha_2$, $\alpha_3$, $\beta_1$, $\beta_2$, $\beta_3$, $\text{Threshold}_1$, $\text{Threshold}_2$), refer to FIGS. 7A-7D, 8, and the related description.

FIGS. 7A-7D are plot diagrams illustrating an exemplary process by which a video coder implements the techniques of deriving a multi-model linear model (MMLM) and applying the MMLM to predict unknown chroma values of chroma samples of a coding unit in accordance with some implementations of the present disclosure. For convenience, the process is described as being performed by a video coder. For each plot, the horizontal axis represents luma values of luma samples, the vertical axis represents chroma values of chroma samples, and each data point in a plot represents a pair of a chroma sample and a corresponding luma sample. In some embodiments, the corresponding luma sample is a down-sampled luma sample. For example, a data point on a plot may represent a pair of a previously-reconstructed chroma sample (e.g., chroma sample 626 of FIG. 6B) in top neighboring chroma group 624 (FIG. 6B) and a corresponding down-sampled luma sample (e.g., down-sampled luma sample 613 of FIG. 6A) in top neighboring luma group 606 (FIG. 6A).

FIG. 7A shows plot 702a with first group of data points 704, each data point (e.g., also known as a reference sample pair) on plot 702a represents a pair of a previously-reconstructed chroma sample (e.g., chroma sample 626 of FIG. 6B) and a corresponding previously-reconstructed luma sample (e.g., down-sampled luma sample 613 of FIG. 6A). The previously-reconstructed chroma samples and their corresponding luma samples are known as "reference chroma samples" and "reference luma samples", respectively. In some embodiments, the video coder selects the reference luma samples for a current luma coding block from the neighboring groups of reconstructed luma samples (e.g., top neighboring luma group 606, left neighboring luma group 610, or both), and selects the reference chroma samples from the neighboring groups of reconstructed chroma samples (e.g., top neighboring chroma group 624, left neighboring chroma group 628, or both). The reference luma samples and their corresponding reference chroma samples are used to derive linear model parameters for the MMLM, such as the ($\alpha_1, \alpha_2, \beta_1, \beta_2$, Threshold) parameters for Equation 1 or ($\alpha_1, \alpha_2, \alpha_3, \beta_1, \beta_2, \beta_3, \text{Threshold}_1, \text{Threshold}_2$) parameters for Equation 2.

In some embodiments (also known as the "MMLM_A mode"), the video coder selects luma reference samples from a top neighboring luma group (e.g., down-sampled luma samples from top neighboring luma group 606 of FIG. 6A) and chroma reference samples from a corresponding top chroma neighboring group (e.g., top neighboring chroma group 624 of FIG. 6B). The down-sampled luma samples from a left neighboring group (e.g., left neighboring luma group 610 of FIG. 6A) and their corresponding chroma samples from a left chroma neighboring group (e.g., left neighboring chroma group 628 of FIG. 6B) are ignored. For example, in FIGS. 6A and 6B, the video coder may select M down-sampled luma samples (e.g., the number of down-sampled luma samples per row of reconstructed luma block 602) and M chroma reference samples (e.g., the number of chroma reference samples per row of chroma block 620) as the reference luma samples and reference chroma samples, or 2M down-sampled luma samples (e.g., twice the number of down-sampled luma samples per row of reconstructed luma block 602) and 2M chroma samples (e.g., twice the number of chroma samples per row of chroma block 620) as the reference luma samples and reference chroma samples. In general, more reference luma samples and reference chroma samples used allow more accurate prediction of chroma values based on luma values (e.g., more accurate determination of MMLM parameters), but at a higher computational cost.

In some embodiments (also known as the "MMLM_L mode"), the video coder selects luma reference samples from a left neighboring luma group (left neighboring luma group 610 of FIG. 6A) and chroma reference samples from a corresponding left neighboring chroma group (left neighboring chroma group 628 of FIG. 6B). The down-sampled luma samples from a top neighboring luma group (e.g., top neighboring luma group 606 of FIG. 6A) and their corresponding chroma samples from a top neighboring chroma group (e.g., top neighboring chroma group 628 of FIG. 6B) are ignored. For example, in FIGS. 6A and 6B, the video coder may select N down-sampled luma samples (e.g., the number of down-sampled luma samples per column of reconstructed luma block 602) and N chroma reference samples (e.g., the number of chroma reference samples per column of chroma block 620) as the reference luma samples and reference chroma samples, or 2N down-sampled luma samples (e.g., twice the number of down-sampled luma samples per column of reconstructed luma block 602) and 2M chroma samples (e.g., twice the number of chroma samples per column of chroma block 620) as the reference luma samples and reference chroma samples.

In some embodiments, the video coder selects luma and chroma reference samples using both the MMLM_L mode and the MMLM_A mode.

FIG. 7B shows plot 702b with second group of data points 706. The video coder uses second group of data points 706 to derive the MMLM parameters. In some embodiments, second group of data points 706 is a subset of first group of data points 704. Reducing the number of luma reference samples and chroma reference samples lowers the computational complexity in deriving the MMLM parameters. The video coder determines second group of data points 706 from first group of data points 704 in the following ways:

In some embodiments, the number of data points (e.g., also known as reference sample pairs) in second group of data points 706 is limited to a predetermined value based on the size and/or the shape of the chroma block (e.g., chroma block 620 of FIG. 6B) of which chroma samples are to be predicted. Four different examples (labeled as Method 1, 2, 3, and 4) are provided in Table 1 below, where n may be 2, 4 and/or 8 depending on the size and shape of the chroma block of the current coding unit.

TABLE 1

| Chroma block size | Method 1 | Method 2 | Method 3 | Method 4 |
|---|---|---|---|---|
| 2 × n/n × 2 | 2 | 4 | 4 | 2 |
| 4 × n/n × 4 (n >= 4) | 4 | 8 | 4 | 4 |
| 8 × n/n × 8 (n >= 8) | 8 | 8 | 4 | 4 |
| 16 × n/n × 16 (n >= 16) | 8 | 8 | 4 | 4 |
| 32 × 32 | 8 | 8 | 4 | 4 |

For example, if the chroma block has a size of 4×8 or 8×4 and the video coder selects Method 1, the number of data points in second group of data points 706 is limited to 4. In another example, if the chroma block has the size of 32×32 and the video coder selects Method 2, the number of data points in second group of data points 706 is limited to 8.

In some embodiments, the MMLM is only applicable to blocks with a block size equal to or larger than a predetermined threshold. For example, a chroma block with a size smaller than the threshold is not to be predicted using the MMLM. In one example, the maximum number of reference sample pairs used for deriving an MMLM is limited to 8 and the block size threshold is limited to 8×8 or 16×16. As a result, smaller chroma blocks that may not have enough associated reference sample pairs are not to be predicted using the MMLM.

In some embodiments, the video coder selects the reference sample pairs in second group of data points 706 through fixed down-sampling. For example, the video coder can use a fixed down-sampling method in which luma or chroma reference samples at the certain-indexed position (e.g., odd-index position) in vertical (e.g., MMLM_L mode) or horizontal direction (e.g., MMLM_A mode) are selected for MMLM parameter derivation.

In some embodiments, the video coder selects the reference sample pairs in second group of data points 706 through adaptive down-sampling. For example, the video coder may select an adaptive down-sampling method in which reference samples are chosen according to (1) a predefined sampling interval, and (2) a starting offset in the vertical or horizontal direction. More specifically, the video coder can determine the sampling interval and the starting offset based on the number of original reference sample pairs (e.g., in first group of data points 704) and the number of reduced reference samples pairs (e.g., in second group of data points 706) in the following way:

1. determine the number of original reference sample pairs: L (e.g., 16)
2. determine the number of reduced reference samples pairs: N (e.g., 8)
3. determine the sampling interval: Δ=L/N (e.g., 2)
4. determine the start offset: offset=Δ/2 (e.g., 1)

The video coder selects a first reference sample (e.g., a luma sample or a chroma sample) at the position (e.g., of the neighboring luma or chroma groups) of a predefined starting position (e.g., the second reference sample) plus the start offset. The position of the other reference samples is the position from the previous point plus the sampling interval.

FIG. 7C shows plot 702c with second group of data points 708, separated by luma threshold 710 into two subgroups based on luma values, with the first subgroup extending from minimum reference luma value 712 to luma threshold 710, and the second subgroup extending from luma threshold to maximum luma value 712. Within each subgroup, the video coder then derives a respective linear model of the MMLM that maps luma values to chroma values.

In some embodiments, the video coder calculates luma threshold 710 by selecting all luma samples (or down-sampled luma samples) in the left neighboring luma group (e.g., left neighboring luma group 610 of FIG. 6A) and ignoring all the other luma samples. The video coder then performs an operation on the selected luma samples such as determining the mean luma value, the median luma value, the mode luma value, or by custom-defined formulas.

In some embodiments, the video coder calculates luma threshold 710 by selecting all luma samples (or down-sampled luma samples) in the top neighboring luma group (e.g., top neighboring luma group 606 of FIG. 6A) and ignoring all the other luma samples. The video coder then performs an operation on the selected luma samples such as determining the mean luma value, the median luma value, the mode luma value, or by custom-defined formulas.

In some embodiments, the video coder calculates luma threshold 710 by selecting all luma samples (or down-sampled luma samples) in both the top and the left neighboring luma group (e.g., left neighboring luma group 610 and top neighboring luma group 606 of FIG. 6A) and ignoring all the other luma samples. The video coder then performs an operation on the selected luma samples such as determining the mean luma value, the median luma value, the mode luma value, or by custom-defined formulas.

In some embodiments, the video coder calculates luma threshold 710 by selecting all luma samples (or down-sampled luma samples) inside the current coding unit (e.g., luma block 602 of FIG. 6A) and ignoring all the other luma samples. The video coder then performs an operation on the selected luma samples such as determining the mean luma value, the median luma value, the mode luma value, or by custom-defined formulas.

In some embodiments, the video coder calculates luma threshold 710 by selecting all luma samples (or down-sampled luma samples) inside the current coding unit (e.g., luma block 602 of FIG. 6A) and the top and the left neighboring groups (e.g., left neighboring luma group 610 and top neighboring luma group 606 of FIG. 6A). The video coder then performs an operation on the selected luma samples such as determining the mean luma value, the median luma value, the mode luma value, or by other custom-defined formulas.

In some embodiments, the custom-defined formulas include finding the minimum and maximum luma values ($L_{min}$ and $L_{max}$) and performing:

$$\frac{Lmax + Lmin}{N},$$

where N is a predefined value such as 2.

Similarly, the video coder can determine chroma threshold 711 by applying the above techniques to chroma neighboring groups.

Although plot 702c includes only one luma threshold 710 that divides the luma values into two separate groups (e.g., there are two linear relations to be derived for the MMLM), in actual practice, there can be multiple luma thresholds that divide the luma values into three or more separate groups (e.g., there are three or more linear relations to be derived for the MMLM). For example, when there are three linear relations in the MMLM, the video coder may determine the two luma thresholds based on the maximum reference luma value 712 and the minimum reference luma value 714 in the following way:

$$\text{Threshold}_1 = \frac{1}{3} * Lmax + \frac{2}{3} * Lmin \quad \text{(Equation 3)}$$
$$\text{Threshold}_2 = \frac{2}{3} * Lmax + \frac{1}{3} * Lmin$$

In another example, all neighboring (top neighboring or left neighboring) reconstructed luma samples (or down-sampled luma samples) are separated into two groups based on the average value of the neighboring reconstructed luma samples. Luma samples with values smaller than the average value belong to one group, and those with values not smaller than the average value belongs to another group. And $\text{Threshold}_1$ and $\text{Threshold}_2$ can be calculated as the average value of each group.

FIG. 7D shows plot 702d in which two linear relations (linear relation 716 and 718) of the MMLM that are derived based on luma threshold 710, minimum reference luma value 712, and maximum reference luma value 714. As described above with reference to FIG. 7C, the video coder first separates the reference samples of second group of data points 708 into two subgroups based on luma threshold 710. Within each subgroup, the video coder determines a respective linear relation (see Equation 1) that maps luma values to chroma values. In some embodiments, the video coder determines the respective linear relation using a regression method (e.g., taking into consideration all data points in the group). However, performing regression is computationally intensive and is often unrealistic for the purpose of video encoding/decoding, e.g., in real time. Therefore, a more efficient implementation for deriving linear relations (e.g., determining the linear parameters in Equation 1) is desired.

In some embodiments, the video coder derives the linear relation 716 and 718 using a Max-Min method. The video coder determines the linear model parameter ($\alpha_1$ $\beta_1$ $\alpha_2$ $\beta_2$) of Equation 1 from (1) the reference sample having the minimum reference luma value 712 (e.g., represented mathematically by A ($X_A$, $Y_A$), where $X_A$ is the minimum reference luma value 712), (2) a data point having luma threshold 710 and chroma threshold 711 (e.g., represented mathematically by Threshold ($X_T$, $Y_T$), where $X_T$ and $Y_T$ are the luma threshold 710 and the chroma threshold 711, respectively), and (3) the reference sample having the maximum reference luma value 714 (e.g., represented mathematically by B ($X_B$, $Y_B$)). Note that although $X_A$ and $X_B$ are minimum and maximum luma values, $Y_A$ and $Y_B$ are not necessarily minimum and maximum chroma values. The video coder determines the linear model parameters in the following way:

$$\alpha_1 = \frac{Y_T - Y_A}{X_T - X_A} \quad \text{(Equation 4)}$$
$$\beta_1 = Y_A - \alpha_1 X_A$$
$$\alpha_2 = \frac{Y_B - Y_T}{X_B - X_T}$$
$$\beta_2 = Y_T - \alpha_2 X_T$$

In some embodiments, for a coding block with a square shape, the video coder applies the above technique directly. For a non-square coding block, in some embodiments, the video coder first subsamples the neighboring reference samples of the longer boundary to have the same number of samples as for the shorter boundary.

In the case where the MMLM includes three linear relations (e.g., represented by Equation 3), the video coder can derive linear model parameters for linear relation in similar manners as described above with respect to the MMLM with two linear relations. For example, assuming that the two threshold data points can be represented as Threshold ($X_{T1}$, $Y_{T1}$) and Threshold ($X_{T2}$, $Y_{T2}$), with $Y_{T2} > Y_{T1}$, the video coder can determine the linear model parameters $\alpha_1$ and $\beta_1$ from the straight-line relationship between A ($X_A$, $Y_A$) and Threshold ($X_{T1}$, $Y_{T1}$). Linear model parameter $\alpha_2$ and $\beta_2$ are derived from the straight-line relationship Threshold ($X_{T1}$, $Y_{T1}$) and Threshold ($X_{T2}$, $Y_{T2}$). Linear model parameter $\alpha_3$ and $\beta_3$ can be derived from the straight-line relationship between Threshold ($X_{T2}$, $Y_{T2}$) and B ($X_B$, $Y_B$).

After deriving the linear relation 716 and 718 of the MMLM, the video coder can predict chroma sample values (e.g., chroma sample value of chroma sample 622 in FIG. 6B) by applying the appropriate linear model to the corresponding luma value (or subsampled luma value).

Figure 8:
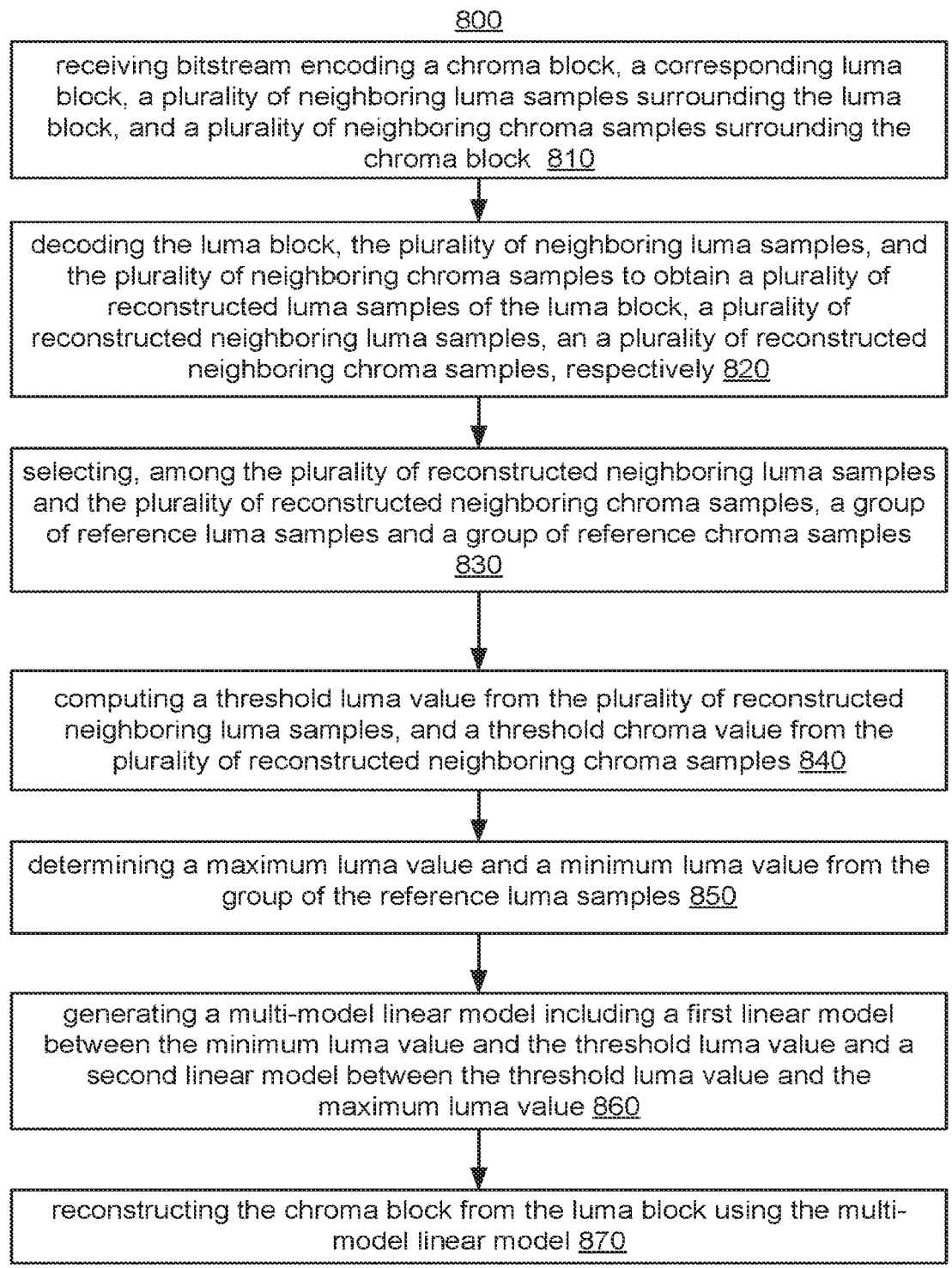
FIG. 8 is a flowchart illustrating an exemplary process by which a video coder implements the techniques of deriving a multi-model linear model and applying the multi-model linear model to predict chroma samples of a coding unit in accordance with some implementations of the present disclosure.

FIG. 8 is a flowchart illustrating an exemplary process 800 by which a video coder implements the techniques of deriving a multi-model linear model (MMLM) and applying the MMLM to predict chroma samples of a coding unit in accordance with some implementations of the present disclosure. For convenience, the process 800 will be described as being performed by a video decoder on a destination device, such as video decoder 30 of FIG. 3.

As the first step, the video decoder receives bitstream (e.g., sent by video encoder 20 of FIG. 2) encoding a chroma block (e.g., chroma block 620 of FIG. 6B), a luma block (e.g., luma block 602 of FIG. 6A) (e.g., the chroma block and the luma block belong to the same coding unit), a plurality of neighboring luma samples surrounding the luma block (e.g., top neighboring luma group 606 and/or left neighboring luma group 610 of FIG. 6A), and a plurality of neighboring chroma samples surrounding the chroma block (e.g., top neighboring chroma group 624 and/or left neighboring chroma group 628) (810) (e.g., one or more luma samples in the plurality of neighboring luma samples corresponds to a chroma sample in the neighboring chroma samples). In some embodiments, the luma block and the chroma block are sampled at different sample rates and have different block sizes and/or shapes. For example, the luma block may be larger than the chroma block and sub-sampling of the luma block is performed to find a sub-sampled luma sample (e.g., a luma sample calculated by averaging neighboring luma samples) corresponding to a chroma sample.

The video decoder then decodes the luma block, the plurality of neighboring luma samples, and the plurality of neighboring chroma samples to obtain a plurality of reconstructed luma samples of the luma block, a plurality of reconstructed neighboring luma samples, and a plurality of reconstructed neighboring chroma samples, respectively (820). For example, the video decoder may decode the luma block, the plurality of neighboring luma samples, and the plurality of neighboring chroma samples using inter-mode prediction or intra-mode prediction. Each reconstructed neighboring luma sample (or reconstructed sub-sampled neighboring luma sample) and its corresponding reconstructed neighboring chroma sample may be represented as a reference data point (e.g., as a data point in first group of data points 704 in FIG. 7A) that illustrates the correspondence between luma and chroma values.

Next, the video decoder selects, from the plurality of reconstructed neighboring luma samples (or reconstructed sub-sampled neighboring luma samples) and the plurality of reconstructed neighboring chroma samples, a group of reference luma samples and a corresponding group of reference chroma samples, respectively (e.g., represented by second group of data points 706 of FIG. 7B) (830). In some embodiments, the reference luma samples and the corresponding reference chroma samples are subsets of the plurality of reconstructed neighboring luma samples and the plurality of reconstructed neighboring chroma samples, respectively. For detail on the selection mechanism, refer to FIG. 7B and the related description.

Next, the video decoder computes a threshold luma value (e.g., an average luma value, a median luma value, or a luma value calculated from other predefined operation) from the plurality of reconstructed neighboring chroma samples, and a threshold chroma value (e.g., an average chroma value, a median chroma value, or a chroma values calculated in other ways from the luma samples) from the plurality of reconstructed neighboring chroma samples (e.g., the data point (threshold luma value, threshold chroma value) represents a "knee point" in the MMLM and is used to separate a first linear model from a second linear model in the MMLM, refer to FIG. 7D and the related description) (840).

After determining the threshold luma value and the threshold chroma value, the video decoder determines a maximum luma value and a minimum luma value from the group of the reference luma samples (850). For example, on plot 702d of FIG. 7D, the maximum luma value is value $X_B$ and the minimum luma value is value $X_A$. The reference samples including the maximum luma value and the minimum luma value are B($X_B$, $Y_B$) and A($X_A$, $Y_A$), respectively. The minimum luma value (e.g., $X_A$ of FIG. 7D), threshold luma value (e.g., $X_T$ of FIG. 7D), and the maximum luma value (e.g., $X_B$ of FIG. 7D) define two separate regions of luma values, with the first region extending from the minimum luma value to the threshold luma value, and the second region extending from the threshold luma value to the maximum luma value. The threshold luma value is between the minimum luma value and the maximum luma value. In some embodiments, if the maximum luma value is different from the minimum luma value, then the threshold luma value is greater than or equal to the minimum luma value, and less than or equal to the maximum luma value. In some embodiments, if the maximum luma value is equal to the minimum luma value (e.g., the region for calculating the maximum and minimum luma values comprises uniform luma samples), then the maximum, minimum, and threshold luma values all are equal to each other. Therefore, The threshold luma value is between the minimum luma value and the maximum luma value if the threshold luma value is greater than or equal to the minimum luma value, and less than or equal to the maximum luma value.

The video decoder then generates a multi-model linear model including a first linear model between the minimum luma value and the threshold luma value and a second linear model between the threshold luma value and the maximum luma value (860). The first linear model is defined by a reference sample including the minimum luma value (e.g., A($X_A$, $Y_A$) of FIG. 7D) and a reference sample including the threshold luma value (e.g., Threshold($X_T$, $Y_T$) of FIG. 7D). The second linear model is defined by the reference sample including the threshold luma value (e.g., Threshold($X_T$, $Y_T$) of FIG. 7D) and a reference sample including the maximum luma value (e.g., B($X_B$, $Y_B$) of FIG. 7D). For example, plot

702*d* of FIG. 7D shows the first and the second linear models as linear relation 716 and linear relation 718, respectively.

Finally, the video decoder reconstructs the chroma block from the luma block using the multi-model linear model (870). In some embodiments, the video decoder may go through each luma sample (or sub-sampled luma sample) in the luma block in a raster scan order, and applies the appropriate linear relation of the MMLM to reconstruct the corresponding chroma sample (e.g., if the luma value of the luma sample is below the luma threshold, apply the first linear relation; if the luma value of the luma sample is greater than the luma threshold, apply the second linear relation).

In some embodiments, generating the multi-model linear model includes: determining a first chroma value of a first reference chroma sample corresponding to a first reference luma sample having the maximum luma value, and a second chroma value of a second reference chroma sample corresponding to a second reference luma sample having the minimum luma value; and wherein the first linear model connects (minimum luma value, first chroma value) and (threshold luma value, threshold chroma value) and the second linear model connects (threshold luma value, threshold chroma value) and (maximum luma value, second chroma value).

In some embodiments, constructing the chroma block from the luma block using the multi-model linear model includes: for a respective chroma sample in the chroma block: determining a respective luma value of a respective luma sample in the reconstructed luma block that corresponds to the respective chroma sample; in accordance with a determination that the respective luma value is smaller than or equal to the threshold luma value: applying the first linear model to the respective luma value to obtain the respective chroma value; and in accordance with a determination that the respective luma value is greater than or equal to the threshold luma value: applying the second linear model to the respective luma value to obtain the respective chroma value.

In some embodiments, computing the threshold luma value includes finding an average luma value from the plurality of reconstructed neighboring luma samples, and computing the threshold chroma value includes finding an average chroma value from the plurality of reconstructed neighboring chroma samples.

In some embodiments, selecting the group of reference luma samples and the group of chroma reference samples includes determining an upper limit of a number of reference luma samples and reference chroma samples to be used.

In some embodiments, selecting the group of reference luma samples and the group of reference chroma samples includes selecting every other luma samples from the plurality of reconstructed neighboring luma samples and every other chroma samples from the plurality of reconstructed neighboring chroma samples.

In some embodiments, computing a second threshold luma value greater than the threshold luma value and a corresponding second threshold chroma value greater than the threshold chroma value, and wherein: the second linear model is applicable to luma values between the threshold luma value and the second threshold luma value, and the third linear model is applicable luma values between the second threshold luma value and the maximum luma value.

In some embodiments, computing the threshold luma value includes finding a weighted average luma value between the maximum luma value and the minimum luma value from the plurality of reconstructed neighboring luma samples, and computing the threshold chroma value includes finding a weighted average chroma value between the maximum chroma value and the minimum chroma value from the plurality of reconstructed neighboring chroma samples.

In some embodiments, computing the threshold luma value includes finding an average luma value from the plurality of reconstructed luma samples of the luma block.

In some embodiments, constructing the chroma block from the luma block using the multi-model linear model includes: for a respective block of chroma samples in the chroma block: determining a respective average luma value of a respective block of luma samples in the decoded luma block that corresponds to the respective block of chroma samples; in accordance with a determination that the respective average luma value is smaller than or equal to the threshold luma value: applying the first linear model to each luma value in the respective block of luma samples to obtain a respective chroma value in the respective block of chroma samples; and in accordance with a determination that the respective average luma value is greater than or equal to the threshold luma value: applying the second linear model to each luma value in the respective block of luma samples to obtain a respective chroma value in the respective block of chroma samples.

Figure 9:
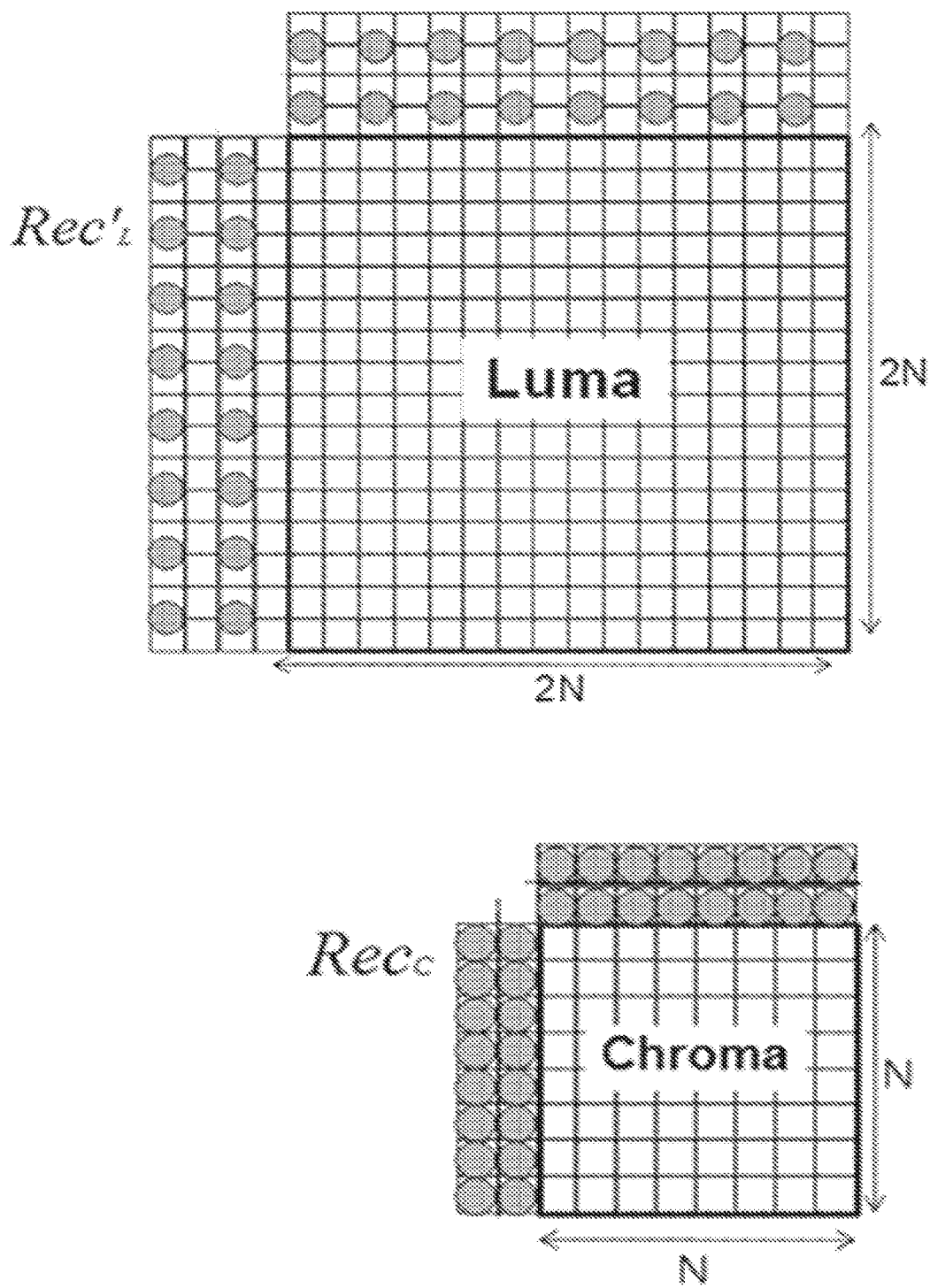
FIG. 9 is a block diagram illustrating locations of the neighboring samples (shown as gray circles) used for MMLM in accordance with some implementations of the present disclosure.

FIG. 9 is a block diagram illustrating locations of the neighboring samples (shown as gray circles) used for MMLM in accordance with some implementations of the present disclosure. In some embodiments, as shown in FIG. 9, a multi-model linear model parameter derivation is from multiple lines. In some embodiments, model parameters for MMLM are generated with multiple lines of reference samples.

Figure 10:
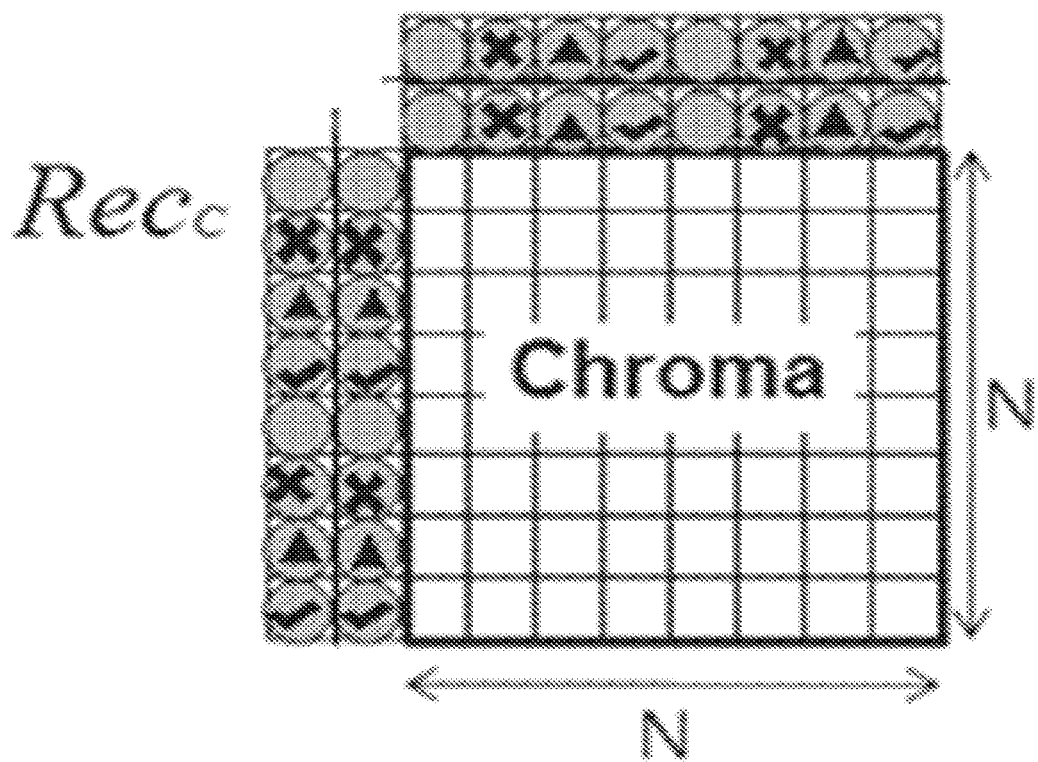
FIG. 10 is a block diagram illustrating locations of four sets of samples used for MMLM in accordance with some implementations of the present disclosure.

In one embodiment, the multiple lines of reference samples are divided into N sets, where N is a positive number and its value may be dynamically changed based on certain coded information of the current block, e.g., the quantization parameter or size of the coded block associated with the TB (transform block)/CB (coding block) and/or the slice/profile. FIG. 10 is a block diagram illustrating locations of four sets of samples used for MMLM in accordance with some implementations of the present disclosure. In FIG. 10, the four sets of samples are represented by different symbols in the gray circles, for examples, gray circles without a symbol, gray circles with a cross symbol, gray circles with a triangle symbol, and gray circles with a check symbol. In another embodiment, the multiple lines of reference samples are divided into N reference sets, where N is a positive number and a code word is dynamically changed to indicate a particular one of the N reference sets based on certain coded information of the current block, e.g., the quantization parameter, the number of sets or the size of coded block associated with the TB/CB and/or the slice/profile.

In an example, a control flag is signaled in the TB/CB/slice/picture/sequence level to indicate whether the signaling of reference sets for the MMLM blocks is enabled or disabled. When the control flag is enabled, a syntax element is further signaled for each CB to indicate that a particular reference set is used for the derivation of linear model parameters in that CB. When the control flag is disabled (e.g., setting the flag to "0"), no further syntax element is signaled at lower levels to indicate the particular reference set for the derivation of linear model parameters and a default reference set (e.g., the available above (top) and left reconstruction) is used for the derivation of linear model parameters.

In some embodiments, a combined MMLM and intra prediction is used to form a prediction. In some embodiments, MMLM and intra prediction with derived weights are combined to form a final prediction. In one embodiment, the weights are derived from the prediction modes of two adjacent blocks of the left (top) and above, and they are combined to form the final prediction. Only the planar mode is used as the intra prediction mode of the combination of weights. In another embodiment, the intra prediction mode of the combination may be the same mode as the collocated luma intra prediction. In yet another embodiment, the weights and/or intra prediction mode of the combination may be signaled in the TB/CB/slice/picture/sequence level to indicate the weights and/or type of the intra prediction mode used in the combination.

In an example, a control flag is signaled in the TB/CB/slice/picture/sequence level to indicate whether the mode of the combined MMLM and intra prediction is enabled or disabled. When the control flag is enabled, a syntax element is further signaled for each CB to indicate that a particular intra prediction is used as the intra prediction mode of the combination in that CB. In another example, a control flag is signaled in the TB/CB/slice/picture/sequence level to indicate whether the mode of the combined MMLM and intra prediction is enabled or disabled. When the control flag is enabled, a syntax element is further signaled for each CB to indicate that the weights are used for the combined MMLM and intra prediction of that CB.

In yet another embodiment, the type of intra mode and weights for combining the final prediction are derived from the prediction modes of two adjacent blocks of the left and above (top).

In an example, a control flag is signaled in the TB/CB/slice/picture/sequence level to indicate whether the mode of the combined MMLM and intra prediction is enabled or disabled. When the control flag is enabled, the intra prediction mode is derived using previously encoded neighboring pixels through a gradient analysis, for example, as the gradient analysis used in DIMD. The mode that shows the highest peak in the histogram is selected as the intra prediction mode of the combination in that CB. The weights may be dynamically changed based on the ratio of the highest peak in the histogram, e.g., the higher the ratio of the highest peak, the higher the weight of the intra mode.

FIG. 11 is a flowchart illustrating an exemplary process 1100 by which a video coder implements the techniques of combining the MMLM and intra prediction to predict or construct a chroma block of a video signal in accordance with some implementations of the present disclosure. For convenience, the process 800 will be described as being performed by a video decoder on a destination device, such as video decoder 30 of FIG. 3.

As the first step, the video decoder receives bitstream (e.g., sent by video encoder 20 of FIG. 2) encoding the chroma block, a corresponding luma block, a plurality of neighboring luma samples surrounding the luma block, and a plurality of neighboring chroma samples surrounding the chroma block (1110).

The video decoder then decodes the luma block, the plurality of neighboring luma samples, and the plurality of neighboring chroma samples to obtain a plurality of reconstructed luma samples of the luma block, a plurality of reconstructed neighboring luma samples, and a plurality of reconstructed neighboring chroma samples, respectively (1120).

The video decoder then selects, from the plurality of reconstructed neighboring luma samples and the plurality of reconstructed neighboring chroma samples, a group of reference luma samples and a group of reference chroma samples, wherein each reference luma sample corresponds to a respective reference chroma sample (1130).

The video decoder then computes a threshold luma value from the group of reference luma samples, and a corresponding threshold chroma value from the group of reference chroma samples (1140).

The video decoder then determines a maximum luma value and a minimum luma value from the group of the reference luma samples, wherein the threshold luma value is between the minimum luma value and the maximum luma value (1150).

The video decoder then generates a multi-model linear model including a first linear model between the minimum luma value and the threshold luma value, and a second linear model between the threshold luma value and the maximum luma value (1160).

The video decoder additionally reconstructs a respective sample value of the chroma block from a weighted combination of a respective first corresponding reconstructed sample value of the luma block using the multi-model linear model, and a respective second reconstructed sample value of a neighboring chroma block from an intra prediction mode (1170).

In some embodiments, the plurality of neighboring luma samples are selected from at least two left lines and at least two top lines surrounding the luma block, and the plurality of neighboring chroma samples are selected from at least two left lines and at least two top lines surrounding the chroma block. For example, the multi-model linear model parameter derivation is from multiple lines as shown in FIG. 9.

In some embodiments, the plurality of neighboring luma samples is divided into a pre-determined number of reference sets, the plurality of neighboring chroma samples are divided into the pre-determined number of reference sets, the group of reference luma samples is selected from one of the pre-determined number of reference sets, and the group of reference chroma samples is selected from one of the pre-determined number of reference sets. For example, as shown in FIG. 10, the multiple lines of reference samples is divided as N reference sets where N is positive number and a dynamically changing code word is used to indicate a particular one of the reference sets based on the certain coded information of the current block, e.g. quantization parameter, number of sets or size of coded block associated with the TB/CB and/or the slice/profile.

In some embodiments, the group of reference luma samples and the group of reference chroma samples are selected based on coded information of a current block including the chroma and the luma block.

In some embodiments, selecting, from the plurality of reconstructed neighboring luma samples and the plurality of reconstructed neighboring chroma samples, the group of reference luma samples and the group of reference chroma samples (1130), includes: determining whether signaling of the pre-determined number of reference sets from a control flag in one selected from the group consisting of TB (transform block), CB (coding block), slice, picture, and sequence level, and in response to a determination that the signaling of the pre-determined number of reference sets is enabled from the control flag, determining from a syntax that a particular set of the pre-determined number of reference sets is selected as the group of reference luma samples and the group of reference chroma samples. In some examples, one control flag is signaled in TB/CB/slice/picture/sequence level to indicate whether the signaling of reference sets for the MMLM blocks is enabled or disabled. When the control flag is signaled as enabled, one syntax element is further signaled for each CB to indicate a particular reference set is used for derivation of linear model parameter in that CB.

In some embodiments, reconstructing the respective sample value of the chroma block from the weighted combination of the respective first corresponding reconstructed sample value of the luma block using the multi-model linear model, and the respective second reconstructed sample value of a neighboring chroma block from the intra prediction mode (1170) includes: receiving in TB/CB/slice/picture/sequence level at least one of a first signaling indicating a weight of the respective first corresponding reconstructed sample value, and a second signaling indicating a type of the intra prediction mode. For example, the weights and/or intra prediction mode of the combination may be signaled in TB/CB/slice/picture/sequence level to indicate the weights and/or type of the intra prediction mode used in the combination. The corresponding weight of the respective second reconstructed sample value can be derived from the weight of the respective first corresponding reconstructed sample value.

In some embodiments, reconstructing the respective sample value of the chroma block from the weighted combination of the respective first corresponding reconstructed sample value of the luma block using the multi-model linear model, and the respective second reconstructed sample value of a neighboring chroma block from the intra prediction mode (1170) is performed when a control flag signaled in TB/CB/slice/picture/sequence level is enabled. In one example, one control flag is signaled in TB/CB/slice/picture/sequence level to indicate whether the mode of combined MMLM and intra prediction is enabled or disabled.

In some embodiments, the intra prediction mode is derived using previously encoded neighboring samples through a gradient analysis.

In some embodiments, the plurality of neighboring luma samples are selected from a single left line and a single top line surrounding the luma block, and the plurality of neighboring chroma samples are selected from a single left line and a single top line surrounding the chroma block. For example, the single left line and the single top line surrounding the luma block or chroma block are illustrated as shown in FIG. 6A and FIG. 6B.

In some embodiments, reconstructing the respective sample value of the chroma block from the respective first corresponding reconstructed sample value of the luma block using the multi-model linear model includes: in accordance with a determination that the respective first corresponding reconstructed sample value of the luma block is smaller than or equal to the threshold luma value: applying the first linear model to the respective first corresponding reconstructed sample value of the luma block to obtain the respective sample value of the chroma block; and in accordance with a determination that the respective first corresponding reconstructed sample value of the luma block is greater than the threshold luma value: applying the second linear model to the respective first corresponding reconstructed sample value of the luma block to obtain the respective sample value of the chroma block.

Figure 12:
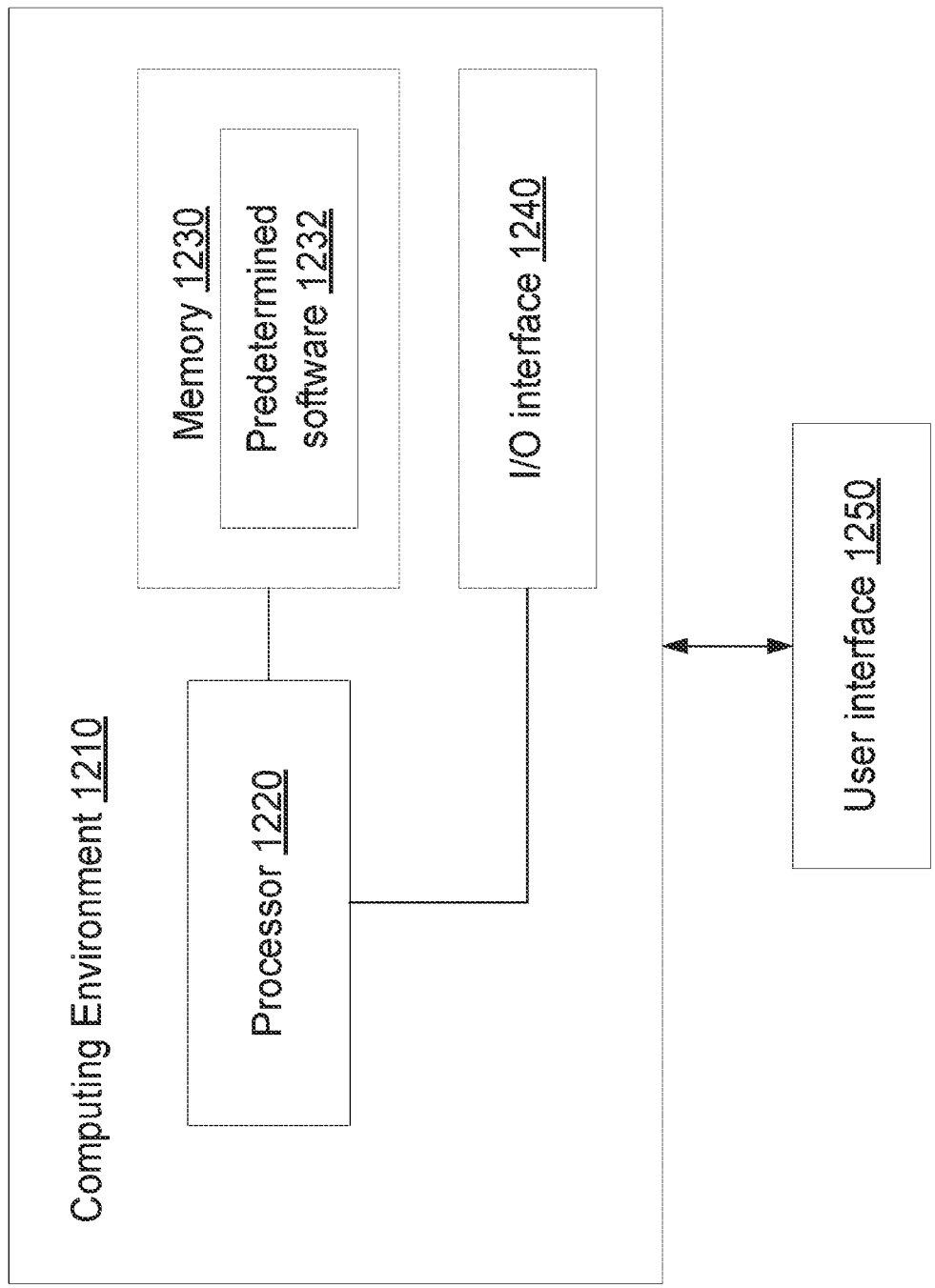
FIG. 12 is a diagram illustrating a computing environment coupled with a user interface, according to some implementations of the present disclosure.

FIG. 12 shows a computing environment 1210 coupled with a user interface 1250. The computing environment 1210 can be part of a data processing server. The computing environment 1210 includes a processor 1220, a memory 1230, and an Input/Output (I/O) interface 1240.

The processor 1220 typically controls overall operations of the computing environment 1210, such as the operations associated with display, data acquisition, data communications, and image processing. The processor 1220 may include one or more processors to execute instructions to perform all or some of the steps in the above-described methods. Moreover, the processor 1220 may include one or more modules that facilitate the interaction between the processor 1220 and other components. The processor may be a Central Processing Unit (CPU), a microprocessor, a single chip machine, a Graphical Processing Unit (GPU), or the like.

The memory 1230 is configured to store various types of data to support the operation of the computing environment 1210. The memory 1230 may include predetermined software 1232. Examples of such data includes instructions for any applications or methods operated on the computing environment 1210, video datasets, image data, etc. The memory 1230 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The I/O interface 1240 provides an interface between the processor 1220 and peripheral interface modules, such as a keyboard, a click wheel, buttons, and the like. The buttons may include but are not limited to, a home button, a start scan button, and a stop scan button. The I/O interface 1240 can be coupled with an encoder and decoder.

In an embodiment, there is also provided a non-transitory computer-readable storage medium comprising a plurality of programs, for example, in the memory 1230, executable by the processor 1220 in the computing environment 1210, for performing the above-described methods. Alternatively, the non-transitory computer-readable storage medium may have stored therein a bitstream or a data stream comprising encoded video information (for example, video information comprising one or more syntax elements) generated by an encoder (for example, the video encoder 20 in FIG. 2) using, for example, the encoding method described above for use by a decoder (for example, the video decoder in FIG. 3) in decoding video data. The non-transitory computer-readable storage medium may be, for example, a ROM, a Random Access Memory (RAM), a CD-ROM, a magnetic tape, a floppy disc, an optical data storage device or the like.

In an embodiment, the is also provided a computing device comprising one or more processors (for example, the processor 1220); and the non-transitory computer-readable storage medium or the memory 1230 having stored therein a plurality of programs executable by the one or more processors, wherein the one or more processors, upon execution of the plurality of programs, are configured to perform the above-described methods.

In an embodiment, there is also provided a computer program product comprising a plurality of programs, for example, in the memory 1230, executable by the processor 1220 in the computing environment 1210, for performing the above-described methods. For example, the computer program product may include the non-transitory computer-readable storage medium.

In an embodiment, the computing environment 1210 may be implemented with one or more ASICs, DSPs, Digital Signal Processing Devices (DSPDs), Programmable Logic Devices (PLDs), FPGAs, GPUs, controllers, micro-controllers, microprocessors, or other electronic components, for performing the above methods.

Further embodiments also include various subsets of the above embodiments combined or otherwise re-arranged in various other embodiments.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

Unless specifically stated otherwise, an order of steps of the method according to the present disclosure is only intended to be illustrative, and the steps of the method according to the present disclosure are not limited to the order specifically described above, but may be changed according to practical conditions. In addition, at least one of the steps of the method according to the present disclosure may be adjusted, combined or deleted according to practical requirements.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for constructing a chroma block of a video signal, comprising:
    receiving a bitstream encoding the chroma block, a corresponding luma block, a plurality of neighboring luma samples surrounding the luma block, and a plurality of neighboring chroma samples surrounding the chroma block;
    decoding the luma block, the plurality of neighboring luma samples, and the plurality of neighboring chroma samples to obtain a plurality of reconstructed luma samples of the luma block, a plurality of reconstructed neighboring luma samples, and a plurality of reconstructed neighboring chroma samples, respectively;
    selecting, from the plurality of reconstructed neighboring luma samples and the plurality of reconstructed neighboring chroma samples, a group of reference luma samples and a group of reference chroma samples, wherein each reference luma sample corresponds to a respective reference chroma sample;
    computing a threshold luma value from the group of reference luma samples, and a corresponding threshold chroma value from the group of reference chroma samples;
    determining a maximum luma value and a minimum luma value from the group of the reference luma samples, wherein the threshold luma value is between the minimum luma value and the maximum luma value;
    generating a multi-model linear model including a first linear model between the minimum luma value and the threshold luma value, and a second linear model between the threshold luma value and the maximum luma value; and
    reconstructing a respective sample value of the chroma block from a weighted combination of a respective first corresponding reconstructed sample value derived from the luma block using the multi-model linear model, and a respective second reconstructed sample value of a neighboring chroma block from an intra prediction mode.

2. The method of claim 1, wherein the plurality of neighboring luma samples are selected from at least two left lines and at least two top lines surrounding the luma block, and the plurality of neighboring chroma samples are selected from at least two left lines and at least two top lines surrounding the chroma block.

3. The method of claim 2, wherein the plurality of neighboring luma samples is divided into a pre-determined number of reference sets, the plurality of neighboring chroma samples are divided into the pre-determined number of reference sets, the group of reference luma samples is selected from one of the pre-determined number of reference sets, and the group of reference chroma samples is selected from one of the pre-determined number of reference sets.

4. The method of claim 3, wherein the group of reference luma samples and the group of reference chroma samples are selected based on coded information of a current block including the chroma block and the luma block.

5. The method of claim 3, wherein selecting, from the plurality of reconstructed neighboring luma samples and the plurality of reconstructed neighboring chroma samples, the group of reference luma samples and the group of reference chroma samples, includes:
    determining whether signaling of the pre-determined number of reference sets from a control flag in one selected from the group consisting of TB (transform block), CB (coding block), slice, picture, and sequence level, and
    in response to a determination that the signaling of the pre-determined number of reference sets is enabled from the control flag, determining from a syntax that a particular set of the pre-determined number of reference sets is selected as the group of reference luma samples and the group of reference chroma samples.

6. The method of claim 1, wherein reconstructing the respective sample value of the chroma block from the weighted combination of the respective first corresponding reconstructed sample value of the luma block using the multi-model linear model, and the respective second reconstructed sample value of a neighboring chroma block from the intra prediction mode includes:

receiving in TB(transform block)/CB(coding block)/slice/picture/sequence level at least one of a first signaling indicating a weight of the respective first corresponding reconstructed sample value, and a second signaling indicating a type of the intra prediction mode.

7. The method of claim 1, wherein reconstructing the respective sample value of the chroma block from the weighted combination of the respective first corresponding reconstructed sample value derived from the luma block using the multi-model linear model, and the respective second reconstructed sample value of a neighboring chroma block from the intra prediction mode is performed when a control flag signaled in TB(transform block)/CB(coding block)/slice/picture/sequence level is enabled.

8. The method of claim 7, wherein the intra prediction mode is derived using previously encoded neighboring samples through a gradient analysis.

9. The method of claim 1, wherein the plurality of neighboring luma samples are selected from a single left line and a single top line surrounding the luma block, and the plurality of neighboring chroma samples are selected from a single left line and a single top line surrounding the chroma block.

10. The method of claim 1, wherein reconstructing a respective sample value of the chroma block from a weighted combination of a respective first corresponding reconstructed sample value derived from the luma block using the multi-model linear model, and a respective second reconstructed sample value of a neighboring chroma block from an intra prediction mode includes:
   in accordance with a determination that a respective luma value of the luma block is smaller than or equal to the threshold luma value: applying the first linear model to the respective luma value of the luma block to obtain the respective first corresponding reconstructed sample value; and
   in accordance with a determination that a respective luma value of the luma block is greater than the threshold luma value: applying the second linear model to the respective luma value of the luma block to obtain the respective first corresponding reconstructed sample value.

11. An electronic apparatus comprising:
   one or more processing units;
   memory coupled to the one or more processing units; and
   a plurality of programs stored in the memory that, when executed by the one or more processing units, cause the electronic apparatus to perform:
   receiving a bitstream encoding a chroma block, a corresponding luma block, a plurality of neighboring luma samples surrounding the luma block, and a plurality of neighboring chroma samples surrounding the chroma block;
   decoding the luma block, the plurality of neighboring luma samples, and the plurality of neighboring chroma samples to obtain a plurality of reconstructed luma samples of the luma block, a plurality of reconstructed neighboring luma samples, and a plurality of reconstructed neighboring chroma samples, respectively;
   selecting, from the plurality of reconstructed neighboring luma samples and the plurality of reconstructed neighboring chroma samples, a group of reference luma samples and a group of reference chroma samples, wherein each reference luma sample corresponds to a respective reference chroma sample;
   computing a threshold luma value from the group of reference luma samples, and a corresponding threshold chroma value from the group of reference chroma samples;
   determining a maximum luma value and a minimum luma value from the group of the reference luma samples, wherein the threshold luma value is between the minimum luma value and the maximum luma value;
   generating a multi-model linear model including a first linear model between the minimum luma value and the threshold luma value, and a second linear model between the threshold luma value and the maximum luma value; and
   reconstructing a respective sample value of the chroma block from a weighted combination of a respective first corresponding reconstructed sample value derived from the luma block using the multi-model linear model, and a respective second reconstructed sample value of a neighboring chroma block from an intra prediction mode.

12. The electronic apparatus according to claim 11, wherein the plurality of neighboring luma samples are selected from at least two left lines and at least two top lines surrounding the luma block, and the plurality of neighboring chroma samples are selected from at least two left lines and at least two top lines surrounding the chroma block.

13. The electronic apparatus of claim 12, wherein the plurality of neighboring luma samples is divided into a pre-determined number of reference sets, the plurality of neighboring chroma samples are divided into the pre-determined number of reference sets, the group of reference luma samples is selected from one of the pre-determined number of reference sets, and the group of reference chroma samples is selected from one of the pre-determined number of reference sets.

14. The electronic apparatus of claim 13, wherein the group of reference luma samples and the group of reference chroma samples are selected based on coded information of a current block including the chroma block and the luma block.

15. The electronic apparatus of claim 13, wherein selecting, from the plurality of reconstructed neighboring luma samples and the plurality of reconstructed neighboring chroma samples, the group of reference luma samples and the group of reference chroma samples, includes:
   determining whether signaling of the pre-determined number of reference sets from a control flag in one selected from the group consisting of TB (transform block), CB (coding block), slice, picture, and sequence level, and
   in response to a determination that the signaling of the pre-determined number of reference sets is enabled from the control flag, determining from a syntax that a particular set of the pre-determined number of reference sets is selected as the group of reference luma samples and the group of reference chroma samples.

16. A non-transitory computer readable storage medium configured to store a bitstream to be decoded by a decoding method comprising:
   receiving a bitstream encoding a chroma block, a corresponding luma block, a plurality of neighboring luma samples surrounding the luma block, and a plurality of neighboring chroma samples surrounding the chroma block;
   decoding the luma block, the plurality of neighboring luma samples, and the plurality of neighboring chroma samples to obtain a plurality of reconstructed luma samples of the luma block, a plurality of reconstructed neighboring luma samples, and a plurality of reconstructed neighboring chroma samples, respectively;

selecting, from the plurality of reconstructed neighboring luma samples and the plurality of reconstructed neighboring chroma samples, a group of reference luma samples and a group of reference chroma samples, wherein each reference luma sample corresponds to a respective reference chroma sample;

computing a threshold luma value from the group of reference luma samples, and a corresponding threshold chroma value from the group of reference chroma samples;

determining a maximum luma value and a minimum luma value from the group of the reference luma samples, wherein the threshold luma value is between the minimum luma value and the maximum luma value;

generating a multi-model linear model including a first linear model between the minimum luma value and the threshold luma value, and a second linear model between the threshold luma value and the maximum luma value; and reconstructing a respective sample value of the chroma block from a weighted combination of a respective first corresponding reconstructed sample value derived from the luma block using the multi-model linear model, and a respective second reconstructed sample value of a neighboring chroma block from an intra prediction mode.

17. The non-transitory computer readable storage medium of claim 16, wherein the plurality of neighboring luma samples are selected from at least two left lines and at least two top lines surrounding the luma block, and the plurality of neighboring chroma samples are selected from at least two left lines and at least two top lines surrounding the chroma block.

18. The non-transitory computer readable storage medium of claim 17, wherein the plurality of neighboring luma samples is divided into a pre-determined number of reference sets, the plurality of neighboring chroma samples are divided into the pre-determined number of reference sets, the group of reference luma samples is selected from one of the pre-determined number of reference sets, and the group of reference chroma samples is selected from one of the pre-determined number of reference sets.

19. The non-transitory computer readable storage medium of claim 18, wherein the group of reference luma samples and the group of reference chroma samples are selected based on coded information of a current block including the chroma block and the luma block.

20. The non-transitory computer readable storage medium of claim 18, wherein selecting, from the plurality of reconstructed neighboring luma samples and the plurality of reconstructed neighboring chroma samples, the group of reference luma samples and the group of reference chroma samples, includes:

determining whether signaling of the pre-determined number of reference sets from a control flag in one selected from the group consisting of TB (transform block), CB (coding block), slice, picture, and sequence level, and in response to a determination that the signaling of the pre-determined number of reference sets is enabled from the control flag, determining from a syntax that a particular set of the pre-determined number of reference sets is selected as the group of reference luma samples and the group of reference chroma samples.

* * * * *